US012790723B2

(12) United States Patent
Hu et al.

(10) Patent No.: US 12,790,723 B2
(45) Date of Patent: Nov. 10, 2026

(54) PEROVSKITE NANOCRYSTAL INDUCED CORE-SHELL NANOFIBERS, TRIBOELECTRIC NANOGENERATORS CONTAINING THE SAME AND METHODS PREPARATION THEREOF

(71) Applicant: City University of Hong Kong, Hong Kong (CN)

(72) Inventors: Jinlian Hu, Hong Kong (CN); Chuanwei Zhi, Hong Kong (CN); Shuai Zhang, Hong Kong (CN)

(73) Assignee: City University of Hong Kong, Hong Kong (CN)

( * ) Notice: Subject to any disclaimer, the term of this patent is extended or adjusted under 35 U.S.C. 154(b) by 179 days.

(21) Appl. No.: 18/887,133

(22) Filed: Sep. 17, 2024

(65) Prior Publication Data

US 2026/0078533 A1 Mar. 19, 2026

(51) Int. Cl.

| | |
|---|---|
| ***D01F 8/10*** | (2006.01) |
| ***D01D 5/00*** | (2006.01) |
| ***H02N 1/00*** | (2006.01) |

(52) U.S. Cl.

CPC ............... *D01F 8/10* (2013.01); *D01D 5/003* (2013.01); *H02N 1/00* (2013.01); *D10B 2321/04* (2013.01)

(58) Field of Classification Search

USPC .......................................................... 428/364

See application file for complete search history.

(56) References Cited

FOREIGN PATENT DOCUMENTS

| | | | | |
|---|---|---|---|---|
| CN | 112457597 A | * | 3/2021 | ................ C08J 5/18 |
| CN | 117431613 A | * | 1/2024 | ......... D04H 1/43828 |
| TW | 1733029 | * | 7/2021 | ............. C09K 11/66 |

OTHER PUBLICATIONS

Yuanjie Su et al.; High-performance piezoelectric composites via β phase programming; Nature Communications (2022) 13:4867.

Feng Jiang et al.; Stretchable, Breathable, and Stable Lead-Free Perovskite/Polymer Nanofiber Composite for Hybrid Triboelectric and Piezoelectric Energy Harvesting; Adv. Mater. 2022, 34, 2200042; pp. 1-12.

Huiying Chen et al.; Piezoelectric Nanogenerator Based on In Situ Growth All-Inorganic CsPbBr3 Perovskite Nanocrystals in PVDF Fibers with Long-Term Stability; Adv. Funct. Mater. 2021, 31, 2011073; pp. 1-12.

Siying Wu et al.; Cesium Lead Halide Perovskite Decorated Polyvinylidene Fluoride Nanofibers for Wearable Piezoelectric Nanogenerator Yarns; ACS Nano 2023, 17, pp. 1022-1035.

Xia Liu et al.; Polymeric Nanofibers with Ultrahigh Piezoelectricity via Self-Orientation of Nanocrystals; ACS Nano 2017, 11, pp. 1901-1910.

(Continued)

*Primary Examiner* — Ula C Ruddock

(74) *Attorney, Agent, or Firm* — S&F/WEHRW

(57) ABSTRACT

A core-shell nanofiber including: a core and a shell surrounding the core, wherein the core comprises $Cs_2InCl_5(H_2O)$ and the shell comprises an electroactive polymer selected from the group consisting of polyvinylidene fluoride (PVDF), polyvinylidene fluoride-trifluoroethylene (PVDF-TrFE), polyvinylidene fluoride-hexafluoropropylene (PVDF-HFP), and mixtures thereof, methods of preparation thereof, and a triboelectric nanogenerator including the same.

19 Claims, 23 Drawing Sheets

(56) References Cited

OTHER PUBLICATIONS

Tong Li et al.; High-Performance Poly(vinylidene difluoride)/Dopamine Core/Shell Piezoelectric Nanofiber and Its Application for Biomedical Sensors; Adv. Mater. 2021, 33, 2006093; pp. 1-11.
Tong Li et al.; Core/Shell Piezoelectric Nanofibers with Spatial Self-Orientated β-Phase Nanocrystals for Real-Time Micropressure Monitoring of Cardiovascular Walls; ACS Nano 2019, 13, pp. 10062-10073.
P. Sengupta et al.; Improved energy harvesting ability of C3H7NH3PbI3 decorated PVDF nanofiber based flexible nanogenerator; Nano Energy 109 (2023) 108277.
Bin Chai et al.; Modulus-Modulated All-Organic Core-Shell Nanofiber with Remarkable Piezoelectricity for Energy Harvesting and Condition Monitoring; Nano Lett. 2023, 23, pp. 1810-1819.
Yujang Cho et al.; Multifunctional Filter Membranes Based on Self-Assembled Core-Shell Biodegradable Nanofibers for Persistent Electrostatic Filtration through the Triboelectric Effect; ACS Nano 2022, 16, p. 19451-19463.

* cited by examiner

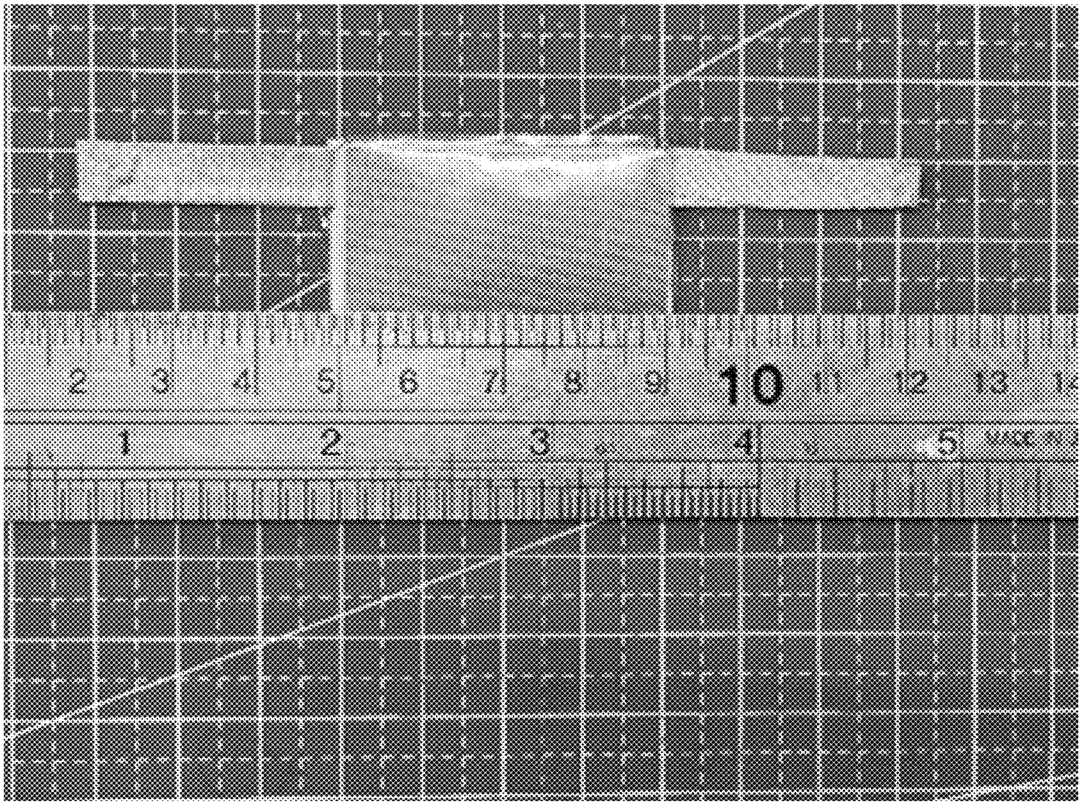
FIG. 23
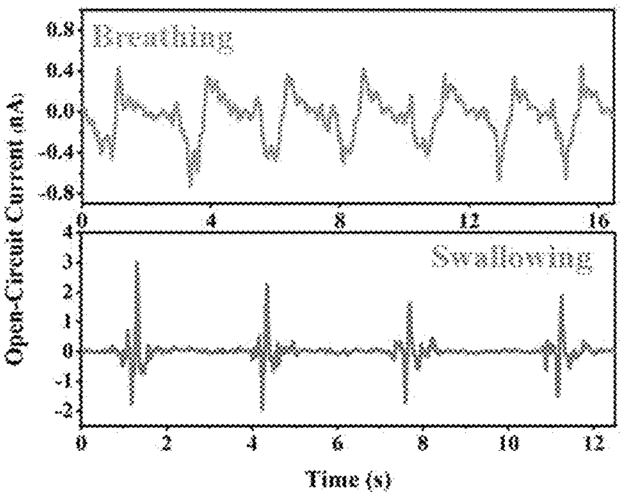
FIG. 24
| Element | C | O | F | Cs | In | Cl |
|---|---|---|---|---|---|---|
| wt% | 65.82 | 0.33 | 32.59 | 0.11 | 0.73 | 0.41 |
FIG. 25

| Materials | Additives | WVT (kg $m^{-2}$ $d^{-1}$) | AP (mm $s^{-1}$) | |
|---|---|---|---|---|
| PVDF | - | 10.6 | 1.3 | |
| PVDF | F-$TiO_2$ | 10.6 | - | |
| PVDF/Ag ink | - | - | 6.16 | |
| PVDF/PU | - | 11.3 | 5.7 | |
| PVDF/Carbon NF/PU | - | 10.26 | - | |
| FPU | TTMA | 13.1 | 5.5 | |
| PU | $SiO_2$ | 7.85 | 5.18 | |
| Waterborne PU | Fluoropolymer | 12.8 | 9.3 | |
| Commercial ePTFE | - | 15.1 | ~ 5.2 | |
| Polyamide | - | 11.2 | 2.6 | |
| **CIC@HFP NFs** | **-** | **18.0** | **8.6 mm $s^{-1}$ (4.3 mL $s^{-1}$)** | **This work** |

FIG. 26

| Perovskite | Counterpart Electrode | Stability | Voc (V) | Isc (μA) | Qsc (nC) | P (W/$m^2$) | |
|---|---|---|---|---|---|---|---|
| $CsPbBr_3$ | PVDF | 1250 | 192 | 16.7 | 79.5 | 1.2 | |
| $Cs_3Bi_2Br_9$ LPPS-NFC | Al foil | 10,000 | 400 | 1.63 μA/$cm^2$ | -- | 2.34 | |
| $CsPbBr_3$ | PVDF | 750 | 220 | 22.8 μA/$cm^2$ | 70 | 3.7 | |
| $CsBi_3I_{10}$ | PDMS | 1500 | 158 | 4.55 μA/$cm^2$ | -- | 4.95 | |
| PDMS-$Sr_3Co_2WO_9$ | Al | 800 | 300 | 2.2 | -- | 0.305 | |
| PVDF-$ZnSnO_3$ | PA6 | -- | 520 | 0.27 μA/$cm^2$ | 62.0 μC/$m^2$ | 0.00047 | |
| KNN-BTO/PDMS | ITO/PET | -- | 610 | 13.7 | -- | 0.55 | |
| $Co(OH)(CO_3)_{0.5}$/Pt/$CsPbIBr_2$ | PVDF | 1350 | 243 | 3.1 μA/$cm^2$ | 9.57 nC/$cm^2$ | 2.04 | |
| $Bi_4Ti_3O_{12}$ /PDMS | PET | 8000 | 300 | 3 | 36 | 0.196 | |
| **CIC@HFP NFs** | **Nylon 6,6 NFs** | **10000** | **681** | **53.1** | **278** | **6.94** | **This work** |

FIG. 27

PEROVSKITE NANOCRYSTAL INDUCED CORE-SHELL NANOFIBERS, TRIBOELECTRIC NANOGENERATORS CONTAINING THE SAME AND METHODS PREPARATION THEREOF

TECHNICAL FIELD

The present disclosure generally relates to $Cs_2InCl_5(H_2O)$ @electroactive polymer core-shell nanofibers useful for manufacture of triboelectric nanogenerators and methods of preparation thereof.

BACKGROUND

The emerging field of wearable electronics requires power sources that are flexible, lightweight, high-capacity, durable, and comfortable for daily use. This allows for a range of applications in electronic skins, self-powered sensing, and physiological health monitoring. Despite making significant progress in the development of multifunctional wearable devices, the issue of power supplies remains a persistent and difficult challenge. Although batteries and supercapacitors are known for their stability and efficiency, their use is limited by lifespan, rigidity, size, encapsulation, and safety concerns. Triboelectric nanogenerators (TENGs) offer a promising solution for future self-powered technology. These generators have the ability to gather mechanical energy from various sources such as raindrops, wind, and tidal energy in addition to human movements such as running, walking, sound vibration, tapping, and even finger bending. The harvested energy can be converted into electricity and used to power wearable devices.

The output performance of TENGs is highly influenced by the inherent properties of the triboelectric materials used. Organic polyvinylidene fluoride (PVDF) and copolymers like poly(vinylidene fluoride)-co-hexafluoropropylene (PVDF-HFP) have been utilized as potential electroactive materials for wearable TENGs because of their exceptional mechanical flexibility, biocompatibility, chemical stability, and good electronegative properties related to the presence of fluorine moieties. PVDF-HFP can be processed into flexible fibrous membrane through electrospinning that possess superior breathability and wearability due to its excellent surface porosity and roughness. Additionally, the process of electrospinning can involve the uniaxial stretching of polymer chains, which encourages the formation of the highest spontaneous polarized β-phase PVDF-HFP and augments the surface charge density.

Recent studies have revealed that the abundant β-phase in PVDF-HFP acts as the working dipole to enhance TENG performance. Conventional inorganic filler strategies, including blending with carbon nanotubes, metal nanoparticles, graphene, and semiconducting perovskites have been exploited to improve the electroactive β-phase content and establish a synergistic role between the blending molecules and PVDF-HFP chains in nanofibers. In comparison with the traditional conductive materials, perovskites may offer a more advantageous approach for energy harvesting due to their flexible energy level tunability, low exciton binding energy, high dielectric constant and electron mobility, which can enhance charge accumulation and ensure efficient charge separation. The inorganic-organic composition with PVDF-HFP can adjust the energy level of perovskites and optimize the interface interaction, thereby improving the charge transfer efficiency and minimizing the charge loss. Moreover, the inherent defects of perovskites may make them effective charge acceptors and attractors, which may enhance the spatial charge polarization and dielectric properties. Therefore, perovskite-based TENGs can exhibit improved overall output performance. Although perovskites offer many advantages, most existing studies have predominantly focused on lead-based halide perovskites. Unfortunately, these perovskites contain toxic lead elements, which are potentially hazardous to human health and the environment. In addition, the use of nanofillers may result in nonuniform dispersion and a mixed anisotropic crystallinity that contains different phases (α, β, and γ) along the uniaxial direction of nanofibers. This can lead to charge loss at the crystal interfaces and limit the improvement of TENG performance. As a result, increasing the β-phase content and controlling its arrangement along the uniaxial orientation remains a significant challenge that is equally critical to overcome. The aforementioned factors facilitate the charge transfer among the continuous domains of β-phase, devoting to an overall improvement in electric conversion efficiency.

There thus exists a need for improved TENGs that address or overcome at least some of the issues described above.

SUMMARY

The present disclosure relates to core/shell biocompatible $Cs_2InCl_5(H_2O)$@PVDF-HFP nanofibers (CIC@HFP NFs) that can be fabricated by one-step electrospinning assisted self-assembly strategy. By the lead-free $Cs_2InCl_5(H_2O)$ as an inducer, uniaxial-oriented CIC@HFP NFs exhibited β-phase-enhanced and self-aligned nanocrystals. This enables the transformation of the nonpolar α-phase, which has randomly oriented dipoles, into the polarized phase with uniform dipoles oriented by the fiber direction. The interface interaction was further investigated by the experimental measurements and molecular dynamics, which revealed that the hydrogen bond effect between the $Cs_2InCl_5(H_2O)$ and PVDF-HFP induced the automatically well-aligned dipoles and stabilized the β-phase in the CIC@HFP NFs. As a result, the fabricated TENG based on the CIC@HFP NFs and nylon 6,6 NFs displays substantially significant improvement in output voltage (681 V), output current (53.1 μA) and peak power density (6.94 W $m^{-2}$), with the highest reported output voltage among TENGs based on halide-perovskites. The human movements collected by the TENG exhibited distinguishable sensing signals, and the energy harvesting performance was further substantiated by charging capacitors and successfully operating the electronics including the commercial LEDs, stopwatch, and calculator, showcasing its promising application in biomechanical energy harvesting and self-powered sensing.

In a first aspect, provided herein is a core-shell nanofiber comprising: a core and a shell surrounding the core, wherein the core comprises $Cs_2InCl_5(H_2O)$ and the shell comprises an electroactive polymer selected from the group consisting of polyvinylidene fluoride (PVDF), polyvinylidene fluoride-trifluoroethylene (PVDF-TrFE), polyvinylidene fluoride-hexafluoropropylene (PVDF-HFP), and mixtures thereof.

In certain embodiments, the electroactive polymer comprises PVDF-HFP.

In certain embodiments, $Cs_2InCl_5(H_2O)$ is present in the core-shell nanofiber at 0.1-5% wt/wt relative to the total weight of $Cs_2InCl_5(H_2O)$ and the electroactive polymer.

In certain embodiments, the electroactive phase content of the PVDF-HFP is greater than 65.9%.

In certain embodiments, the electroactive phase content of the PVDF-HFP is 70-81.25%.

In certain embodiments, a plurality of the core-shell nanofibers has an average diameter of 450-600 nm.

In certain embodiments, the electroactive polymer comprises PVDF-HFP; $Cs_2InCl_5(H_2O)$ is present in the core-shell nanofiber at 0.5-3% wt/wt relative to the total weight of $Cs_2InCl_5(H_2O)$ and PVDF-HFP; and the electroactive phase content of the PVDF-HFP is 70-81.25%.

In certain embodiments, the electroactive polymer comprises PVDF-HFP; $Cs_2$ $InCl_5(H_2O)$ is present in the core-shell nanofiber at 1-2% wt/wt relative to the total weight of $Cs_2$ $InCl_5(H_2O)$ and PVDF-HFP; and the electroactive phase content of the PVDF-HFP is 75-81.25%.

In certain embodiments, the electroactive polymer comprises PVDF-HFP; $Cs_2InCl_5(H_2O)$ is present in the core-shell nanofiber at about 1.5% wt/wt relative to the total weight of $Cs_2InCl_5(H_2O)$ and PVDF-HFP; and the electroactive phase content of the PVDF-HFP is about 81.25%.

In a second aspect provided herein is a method for preparing the core-shell nanofiber of described herein, the method comprising: providing an electrospinning solution comprising $Cs_2InCl_5(H_2O)$, the electroactive polymer, and a solvent; and electrospinning the electrospinning spinning solution thereby forming the core-shell nanofiber.

In certain embodiments, the solvent comprises dimethyl formamide and acetone.

In certain embodiments, the electrospinning solution has a solids concentration of 15-25% wt/wt.

In certain embodiments, the method further comprises drying the core-shell nanofiber.

In certain embodiments, the electrospinning solution comprises $Cs_2InCl_5(H_2O)$ and PVDF-HFP in a weight ratio of about 1.5 to about 98.5, respectively.

In a third aspect, provided herein is a triboelectric nanogenerator comprising a triboelectric layer and at least one electrode, wherein the triboelectric layer comprises a plurality of the core-shell nanofibers described herein.

In a fourth aspect, provided herein is a triboelectric nanogenerator comprising a first electrode; a first triboelectric layer comprising a plurality of the core-shell nanofibers described herein disposed on a surface of the first electrode; a second triboelectric layer disposed on a surface of the first triboelectric layer opposite of the first electrode, and a second electrode disposed on a surface of the second triboelectric layer opposite of the first triboelectric layer, wherein the first triboelectric layer has a triboelectric polarity different from that of the second triboelectric layer.

In certain embodiments, the second triboelectric layer comprises silk, wool, rabbit fur, cotton, cellulose acetate, paper, polymethyl methacrylate, silica, nylon, polyurethane, or a combination thereof.

In certain embodiments, the triboelectric nanogenerator further comprises a spacer layer disposed between the first triboelectric layer and the second triboelectric layer.

In certain embodiments, the spacer layer comprises one or more elastomeric materials selected from the group consisting of an elastic polymer, an elastic foam, a metal spring, a plastic spring, and combinations thereof.

In certain embodiments, each of the first electrode and the second electrode independently comprise conductive cloth, copper, gold, silver, platinum, aluminum, nickel, an alloy thereof, or a combination thereof.

BRIEF DESCRIPTION OF THE DRAWINGS

The above and other objects and features of the present disclosure will become apparent from the following description of the disclosure, when taken in conjunction with the accompanying drawings.

FIG. 23. The optical image of the prepared TENG with the size of 2*4 $cm^2$.

FIG. 24. The short-circuit current generated by the breathing and swallowing.

FIG. 25. The element content of the 1.5CIC@HFP nanofiber.

FIG. 26. Comparison on WVTR and AP performance between our work and the previous reports based on nanofibers.

FIG. 27. Comparison on TENG performances based on halide-perovskite and polymer nanofibers between our work and the previous reports.

DETAILED DESCRIPTION

Definitions

Figure 1:
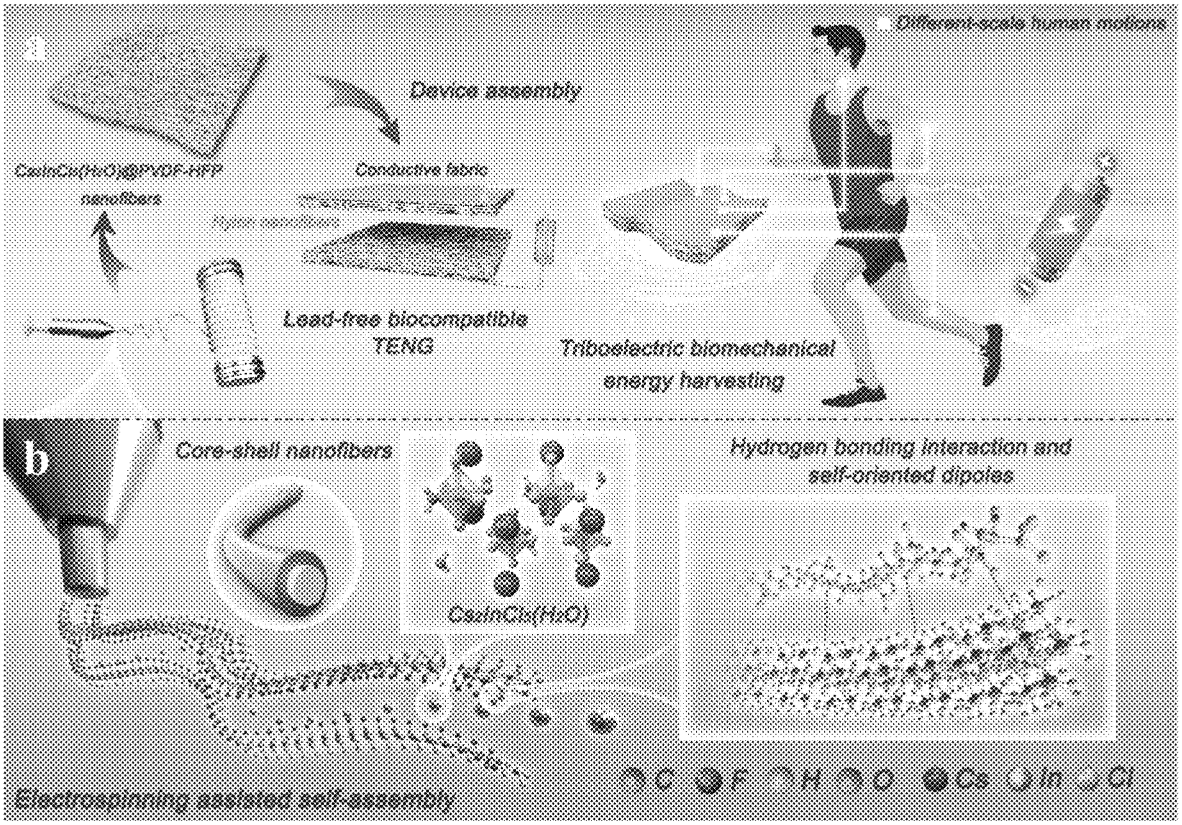
FIG. 1. The schematic diagram of the core-shell CIC@HFP NFs and its application. a) The fabrication of CIC@HFP NFs and its application for biomechanical energy harvesting. b) The schematic mutual interaction of the $Cs_2InCl_5(H_2O)$ and PVDF-HFP chain.

The following terms shall be used to describe the present invention. In the absence of a specific definition set forth herein, the terms used to describe the present invention shall be given their common meaning as understood by those of ordinary skill in the art.

Throughout the present disclosure, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the present invention.

Furthermore, throughout the present disclosure and claims, unless the context requires otherwise, the word "include" or variations such as "includes" or "including", will be understood to imply the inclusion of a stated integer or group of integers, but not the exclusion of any other integer or group of integers.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10%, ±7%, ±5%, ±3%, ±1%, or ±0% variation from the nominal value unless otherwise indicated or inferred.

Provided herein is a core-shell nanofiber comprising: a core and a shell at least partially surrounding the core, wherein the core comprises $Cs_2InCl_5(H_2O)$ and the shell comprises an electroactive polymer selected from the group consisting of PVDF, PVDF-TrFE, PVDF-HFP, and mixtures thereof.

In certain embodiments, the electroactive polymer comprises β phase PVDF-HFP

The electroactive polymer can have an average molecular weight of 100,000-1,000,000 kDa, 100,000-900,000 kDa, 100,000-800,000 kDa, 100,000-700,000 kDa, 100,000-600,000 kDa, 100,000-500,000 kDa, 200,000-500,000 kDa, 300,000-500,000 kDa, 100,000-700,000 kDa, 200,000-600,000 kDa, 200,000-500,000 kDa, 300,000-600,000 kDa, or 350,000-450,000 kDa. In certain embodiments, the electroactive polymer has an average molecular weight about 400,000 kDa. In certain embodiments, the electroactive polymer comprises PVDF-HFP having an average molecular weight of about 400,000 kDa.

In certain embodiments, the $Cs_2InCl_5(H_2O)$ has an average crystallite size of 20-50 nm.

The $Cs_2InCl_5(H_2O)$ can be present in the core-shell nanofiber at 0.1-5% wt/wt, 0.5-5% wt/wt, 0.5-4.5% wt/wt, 0.5-4% wt/wt, 0.5-3.5% wt/wt, 0.5-3. % wt/wt, 0.5-2.5% wt/wt, 0.5-2% wt/wt, or 1-2% wt/wt relative to the total weight of $Cs_2InCl_5(H_2O)$ and the electroactive polymer. In certain embodiments, $Cs_2InCl_5(H_2O)$ is present in the core-shell nanofiber at about 1.5% wt/wt relative to the total weight of $Cs_2InCl_5(H_2O)$ and the electroactive polymer Advantageously, the electroactive phase of the electroactive polymer in the core-shell nanofiber is surprisingly increased when the electroactive polymer and $Cs_2InCl_5(H_2O)$ are electrospun from an electrospinning solution comprising the same. In certain embodiments, the electroactive phase content of the electroactive polymer in the core-shell nanofiber is greater than 65.9%, greater than 70%, greater than 75%, or greater than 80%. In certain embodiments, the electroactive phase content of the electroactive polymer in the core-shell nanofiber is 70-81.25%, 71-81.25%, 72-81.25%, 73-81.25%, 74-81.25%, 75-81.25%, 76-81.25%, 77-81.25%, 78-81.25%, 79-81.25%, 80-81.25%, 80.25-81.25%, 80.5-81.25%, 80.75-81.25%, 81-81.25%, 69.5-81.25%, 73.6-81.25%, 76.8-81.25%, or 77.6-81.25%. In certain embodiments, the electroactive phase content of the electroactive polymer in the core-shell nanofiber is about 81.25%, As demonstrated below, the diameter of the core-shell nanofibers can vary based on the concentration of $Cs_2InCl_5$ $(H_2O)$ in the electrospinning solution. In certain embodiments, the average diameter of the core-shell nanofiber can range from 1-1,000 nm, 100-1,000 nm, 100-900 nm, 200-800 nm, 300-800 nm, 400-800 nm, 500-800 nm, 600-800 nm, 700-800 nm, 200-700 nm, 200-600 nm, 200-500 nm, 200-400 nm, 200-300 nm, 300-700 nm, 400-600 nm, 450-550 nm, 470-570 nm, 490-570 nm, 500-570 nm, 557-570 nm, 470-557 nm, 470-557 nm, 470-500 nm, or 470-490 nm. In certain embodiments, the average diameter of the core-shell nanofiber is about 500 nm.

The average diameter of the core can range from 5-400 nm, 5-350 nm, 5-300 nm, 5-250 nm, 5-200 nm, 5-150 nm, 5-100 nm, 5-50 nm, 50-400 nm, 100-400 nm, 150-400 nm, 200-400 nm, 250-400 nm, 300-400 nm, 350-400 nm, or 250-350 nm. In certain embodiments, the average diameter of the core is about 300 nm.

The shell can have an average thickness ranging from 1-600 nm, 50-600 nm, 100-600 nm, 100-550 nm, 155-550 nm, 200-550 nm, 250-550 nm, 300-550 nm, 350-550 nm, 400-550 nm, 500-550 nm, 155-500 nm, 155-450 nm, 155-400 nm, 155-350 nm, 155-300 nm, 155-250 nm, 155-200 nm, 50-150 nm, 60-140 nm, 70-130 nm, 80-120 nm, 90-110 nm, 10-90 nm, 20-80 nm, 30-70 nm, 40-60 nm, or 45-55 nm. In certain embodiments, the shell can have an average thickness of about 50.

The core-shell nanofiber described herein can be prepared in a one-step process by a method comprising: providing an electrospinning solution comprising $Cs_2InCl_5(H_2O)$, the electroactive polymer, and a solvent; and electrospinning the electrospinning spinning solution thereby forming the core-shell nanofiber.

Any solvent in which the electroactive polymer and $Cs_2InCl_5(H_2O)$ are at least partially soluble can be used in the methods described herein. Exemplary solvents includes, but are not limited to dimethylacetamide, dimethylformamide, dimethylsulfoxide, acetone, and mixtures thereof. In certain embodiments, the solvent comprises dimethylformamide and acetone.

$Cs_2InCl_5(H_2O)$ and the electroactive polymer can be present in the solvent at a weight ratio of 0.1-5:95-99.9, 0.5-5:95-99.5, 0.5-4.5:95.5-99.5, 0.5-4:96-99.5, 0.5-3.5:96.5-99.5, 0.5-3:97-99.5, 0.5-2.5:97.5-99.5, 0.5-2:98-99.5, or 1-2:98-99, respectively. In certain embodiments, the $Cs_2InCl_5(H_2O)$ and the electroactive polymer are present in the solvent at a weight ratio of about 1.5 to about 98.5, respectively.

The concentration of the total weight of $Cs_2InCl_5(H_2O)$ and the electroactive polymer in the solvent can range from 5-40% wt/wt, 5-35% wt/wt, 5-30% wt/wt, 10-30% wt/wt, 15-25% wt/wt, 16-24% wt/wt, 17-23% wt/wt, 18-22% wt/wt, or 19-21% wt/wt. In certain embodiments, the concentration of the total weight of $Cs_2InCl_5(H_2O)$ and the electroactive polymer in the solvent is about 20% wt/wt.

The method of preparing the nanofiber can further comprise drying the core-shell nanofiber, e.g., at 60° C.

The present disclosure also provides a triboelectric nanogenerator comprising a triboelectric layer and at least one electrode, wherein the triboelectric layer comprises a plurality of the core-shell nanofibers described herein. The triboelectric nanogenerator can be a vertical contact-separation mode triboelectric nanogenerator, a lateral sliding mode triboelectric nanogenerator, a single-electrode mode triboelectric nanogenerator, or a freestanding triboelectric-layer mode triboelectric nanogenerator.

Figure 28:
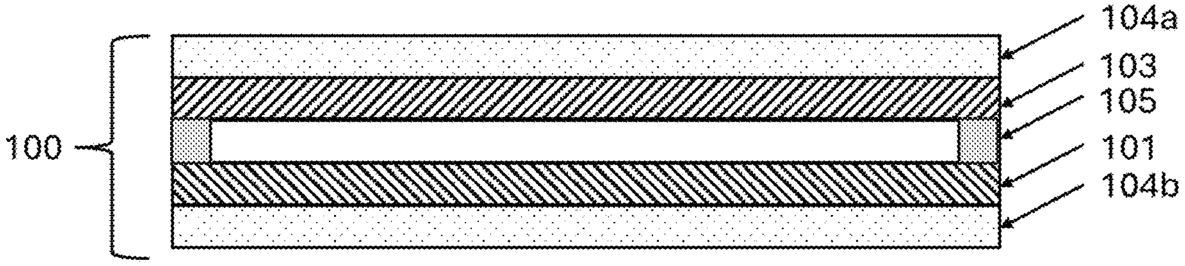
FIG. 28. Illustrates an exemplary triboelectric nanogenerator 100 in accordance with certain embodiments described herein in which 101 is the first triboelectric layer comprising a plurality of the core-shell nanofibers described herein, 103 is the second triboelectric layer, **104*a* and 104*b*** are the first and second electrode, and 105 is the spacer layer.

FIG. 28 illustrates an exemplary vertical contact-separation mode triboelectric nanogenerator 100 in accordance with certain embodiments described herein in which 101 is the first triboelectric layer comprising the plurality of the core-shell nanofibers described herein, 103 is the second triboelectric layer, 104*a* and 104*b* are the first and second electrode, and 105 is the spacer layer.

In certain embodiments, the triboelectric nanogenerator comprises a first electrode; a first triboelectric layer comprising a plurality of the core-shell nanofibers of described herein disposed on a surface of the first electrode; a second triboelectric layer disposed on a surface of the first triboelectric layer opposite of the first electrode, and a second electrode disposed on a surface of the second triboelectric layer opposite of the first triboelectric layer, wherein the first triboelectric layer has a triboelectric polarity different from that of the second triboelectric layer.

In certain embodiments, the second triboelectric layer comprises a triboelectric positive material. In certain embodiments, the second triboelectric layer comprises a triboelectric positive material selected from the group consisting of silk, wool, rabbit fur, cotton, cellulose acetate, paper, polymethyl methacrylate, silica, nylon, polyurethane, and combinations thereof. In certain embodiments, the triboelectric positive material comprises nylon 6,6.

The spacer layer ensures that the first triboelectric layer and the second triboelectric layer do not come into physical contact. As such any elastic materials or springs to ensure contact-separation under pressure-release cycles can be used to separate the first triboelectric layer and the second triboelectric layer. In certain embodiments, the spacer layer comprises one or more elastomeric materials selected from the group consisting of an elastic polymer, an elastic foam, or a metal or plastic spring, and a combination thereof.

The first electrode and the second electrode can independently comprise conductive cloth, copper, gold, silver, platinum, aluminum, nickel, an alloy thereof, or a combination thereof. In certain embodiments, the first electrode and the second electrode comprise conductive cloth.

A one-step electrospinning process was used to develop the $Cs_2InCl_5(H_2O)$ perovskite nanocrystals induced core-shell PVDF-HFP nanofibers (CIC@HFP NFs) on the collector (FIG. 1). The suspension of $Cs_2InCl_5(H_2O)$ perovskite nanocrystals in PVDF-HFP solution was used as the precursor for subsequent electrospinning. Perovskite has the advantages of its energy tunability, high dielectric constant and electron mobility, which can enhance the charge accumulation and separation. $Cs_2InCl_5(H_2O)$ nanocrystal was selected as the inducing agent because of its potential interaction between the —OH groups of nanocrystals and the —F moieties of the PVDF-HFP chains can function as the nucleation sites for electroactive β-phase crystallization. Under the electric field, the O—H bonds and —F groups in the nanocrystals and PVDF-HFP are susceptible to polarization and thus oppositely charged in a fixed direction. The oppositely charged groups form a stable directional O—H . . . F hydrogen bond network due to electrostatic attraction and dipole interaction. The interacting O—H . . . F hydrogen bond network emerges from the pinhole to form the core by the charge transfer, while the non-interacting PVDF-HFP has the advantage of competitive migration due to its low surface energy, and thus occurs phase separation and migrates to the surface of the nanofiber to form a continuous shell. In addition, the constant tensile force during electrospinning causes the PVDF-HFP chains to be uniaxially stretched, resulting in the in-situ formation of ordered OH—CF2 dipoles, which induces the phase transition from the randomly oriented non-polar α phase to the polar β phase. (FIG. 1*b*). This electroactive configuration of PVDF-HFP as the negative electrode can greatly improve the performance of TENGs. As a potential demonstration, a high-performance TENG using CIC@HFP NFs as negative electrode material was fabricated, which can realize energy harvesting and physiological monitoring from diverse human movements, showing great potential in triboelectric biomechanical energy harvesting and self-powered sensing (FIG. 1*a*).

Figure 2:
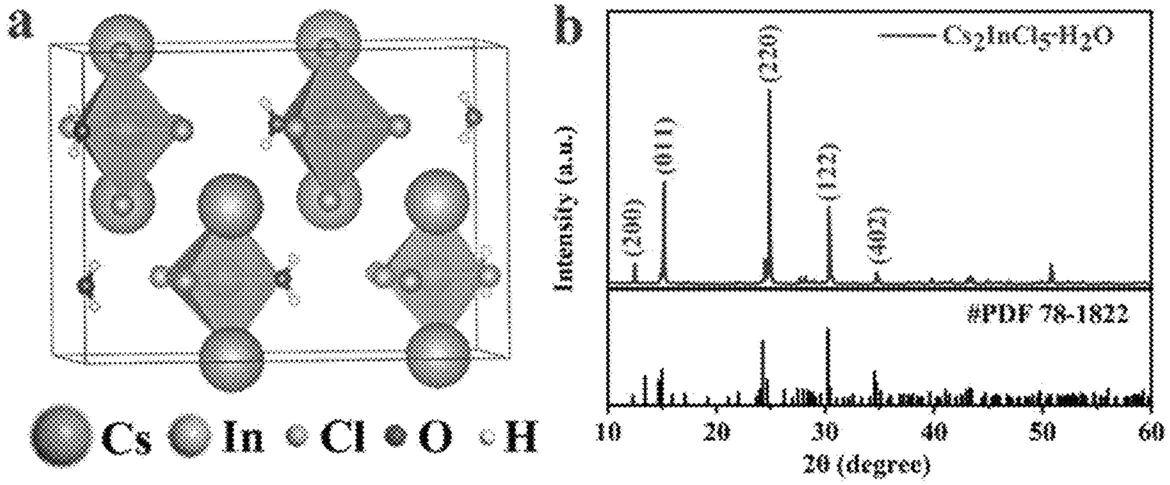
FIG. 2. The characterizations of the CIC@HFP nanofibrous membrane. a) The crystal structure of $Cs_2InCl_5(H_2O)$ unit cell. b) The XRD patterns of $Cs_2InCl_5(H_2O)$. c) SEM image of the CIC@HFP NFs. d) TEM image of the CIC@HFP NFs. e) The absorbance mode of FT-IR spectrum of CIC@HFP NFs at 650-1500 $cm^{-1}$. f) DSC curves of the CIC@HFP NFs with different $Cs_2InCl_5(H_2O)$ contents. g) XRD patterns of the CIC@HFP NFs. h) Tensile-stress curves of the CIC@HFP NFs. i) Water vapor transfer rate (WVTR) and air permeability. j) Fluorescence staining of NIH 3T3 co-cultured with the CIC@HFP NFs. k) Growth analysis of the NIH 3T3 incubated in cell media of the CIC@HFP NFs.
Figure 2:
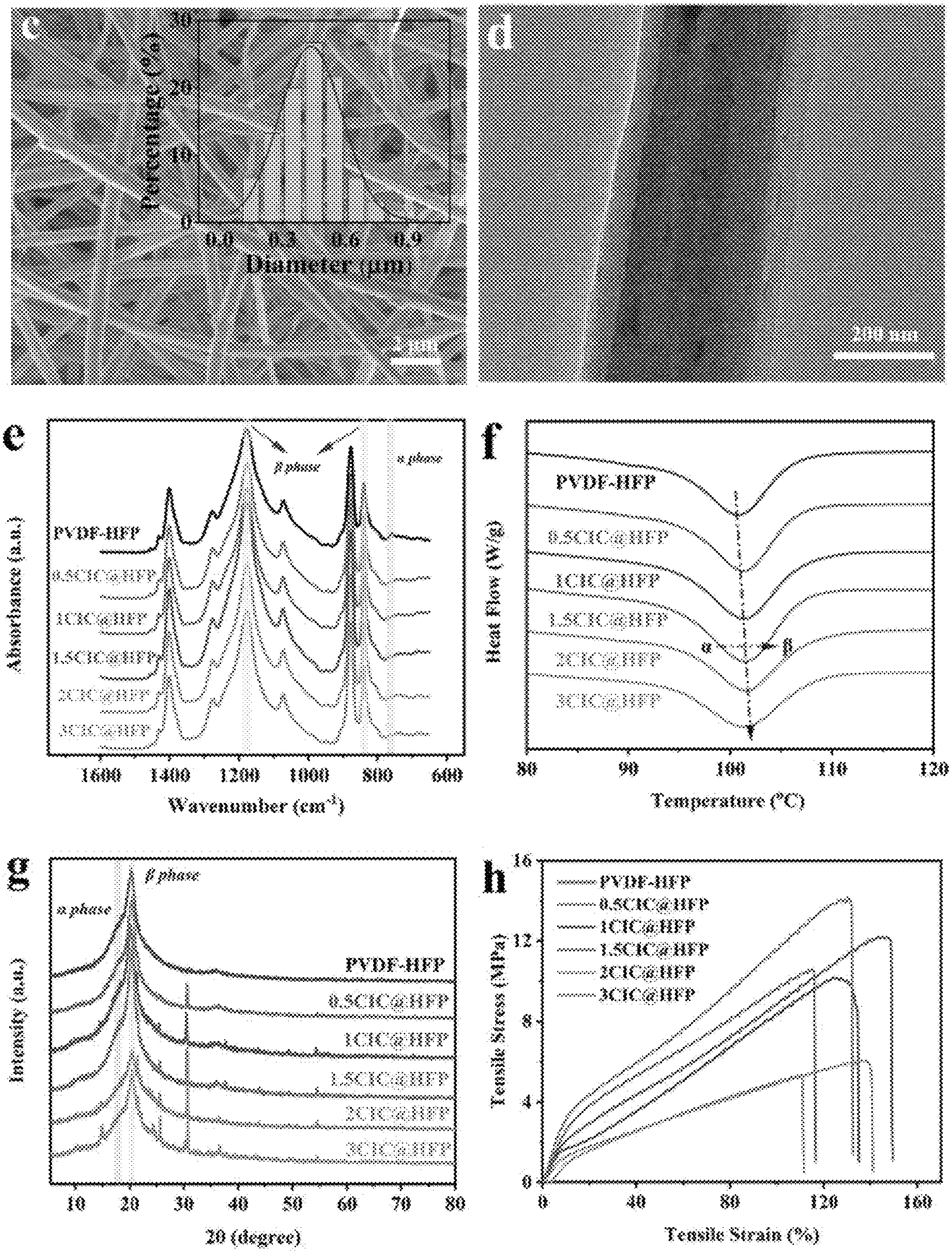
Figure 2:
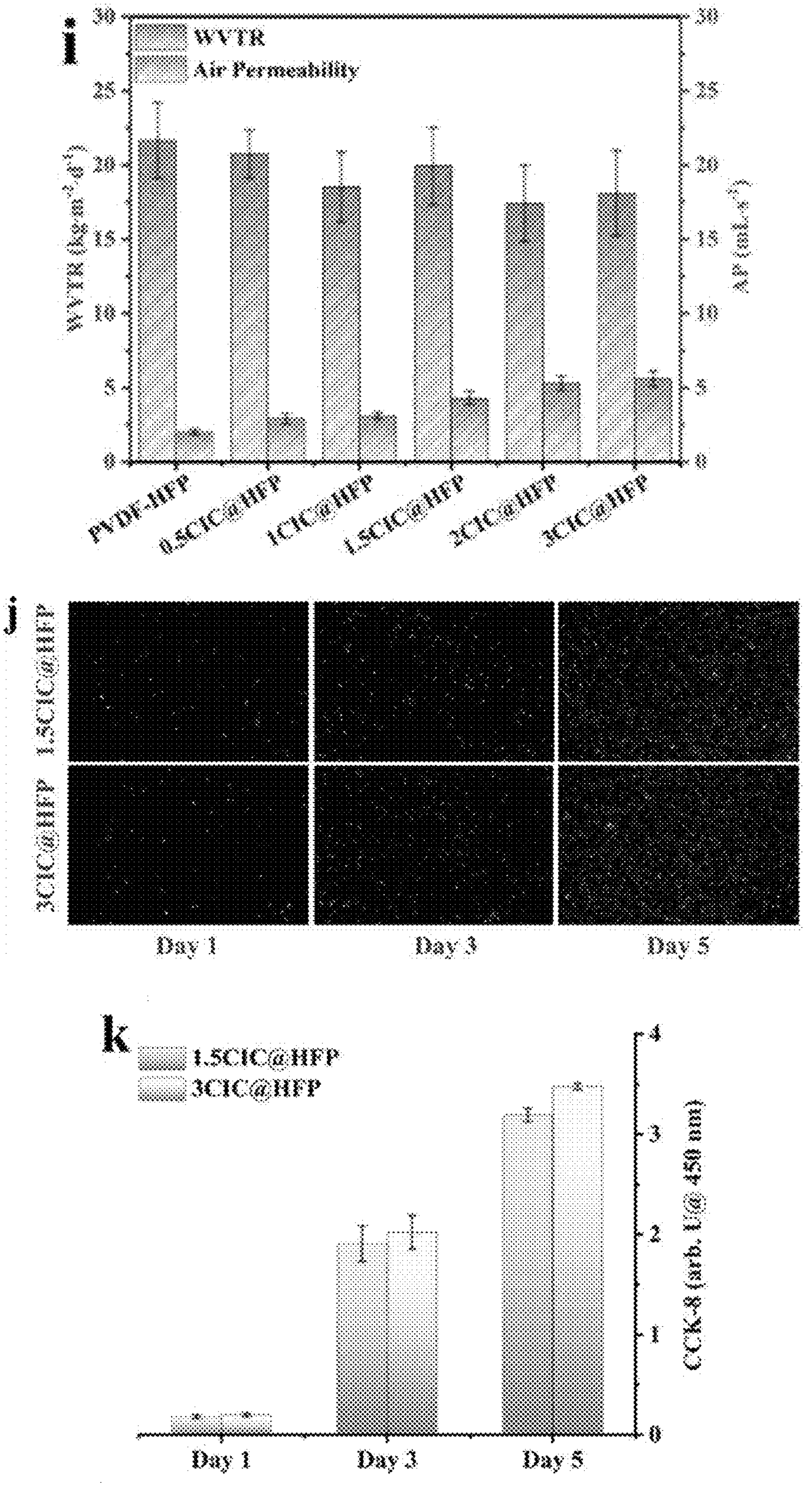
Figure 9:
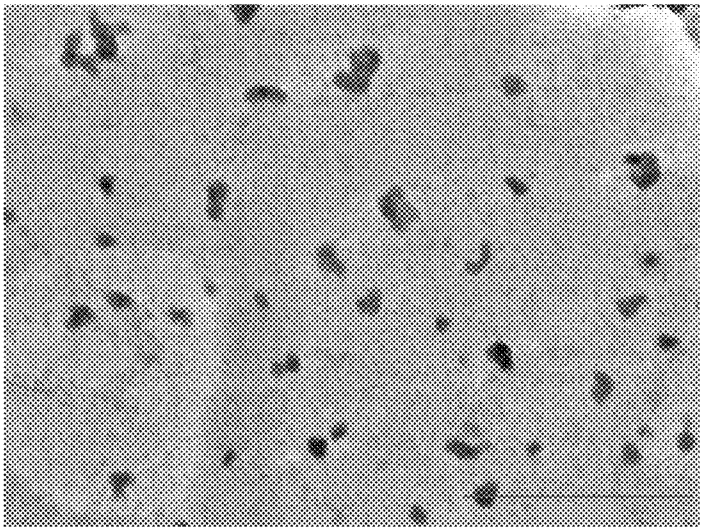
FIG. 9. The TEM image of $Cs_2InCl_5(H_2O)$ nanocrystals.
Figure 10:
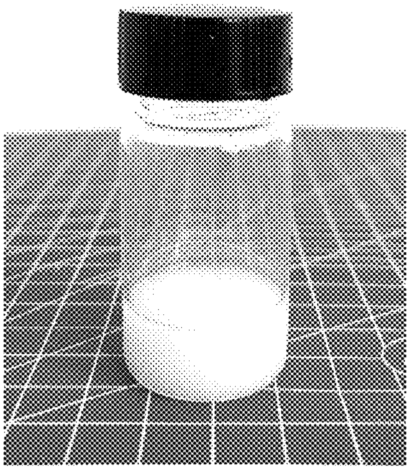
FIG. 10. The optical image of the $Cs_2InCl_5(H_2O)$ nanocrystals dispersed in the PVDF-HFP solution after 48 h.
Figure 11:
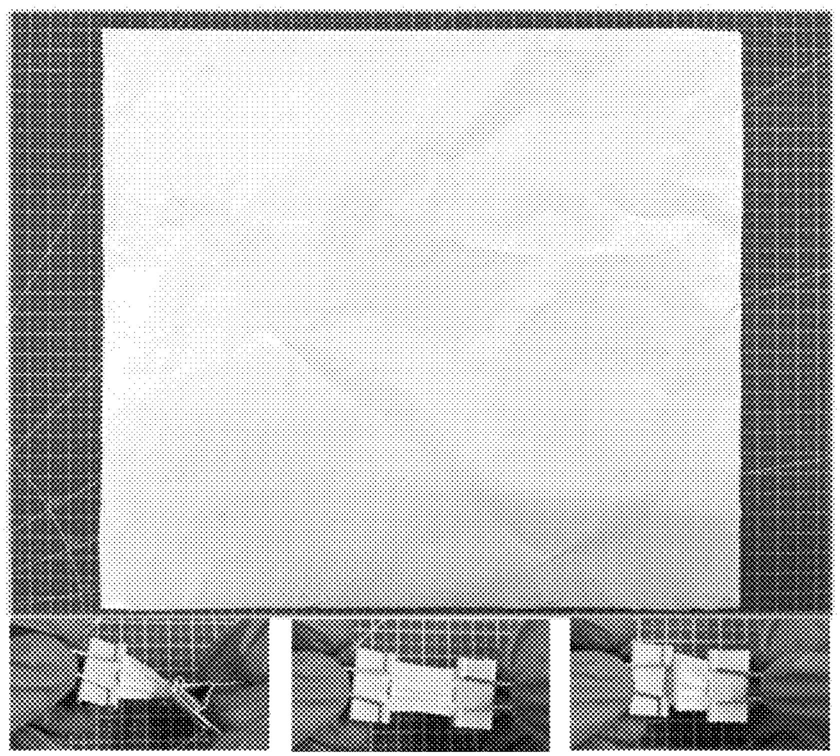
FIG. 11. The optical image of the CIC@HFP NFs.
Figure 12:
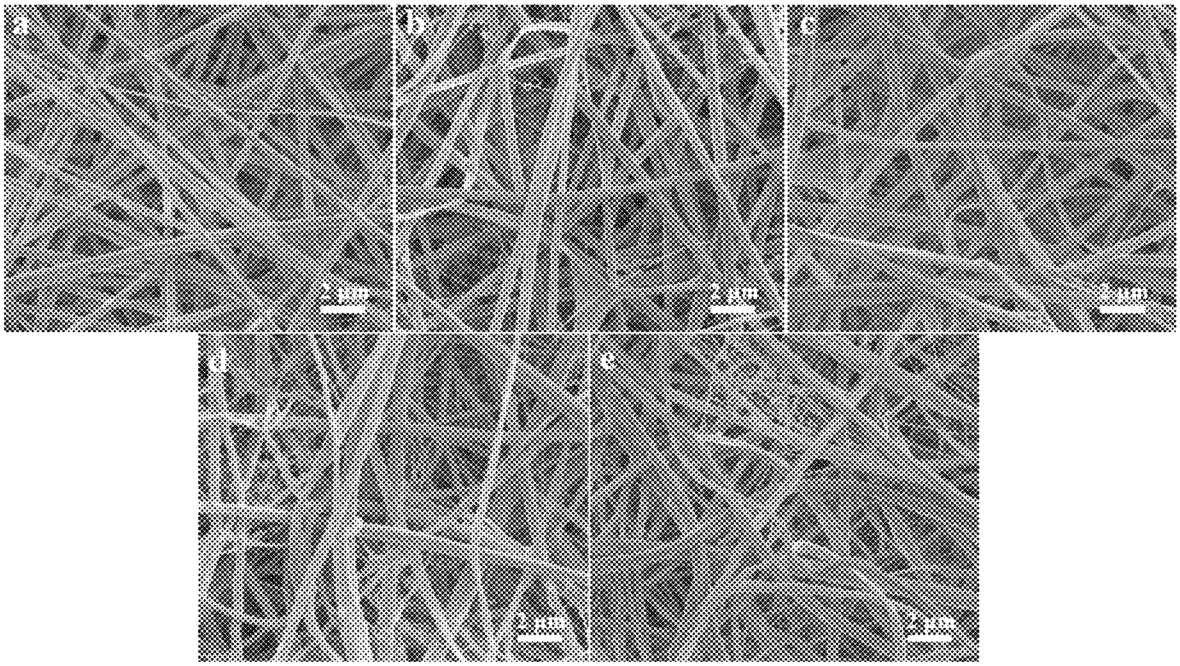
FIG. 12. The SEM image of the CIC@HFP nanofibers with different CIC concentrations. a) PVDF-HFP nanofibers; b) 0.5CIC@HFP nanofibers; c) 1CIC@HFP nanofibers; d) 2CIC@HFP nanofibers; e) 3CIC@HFP nanofibers.
Figure 13:
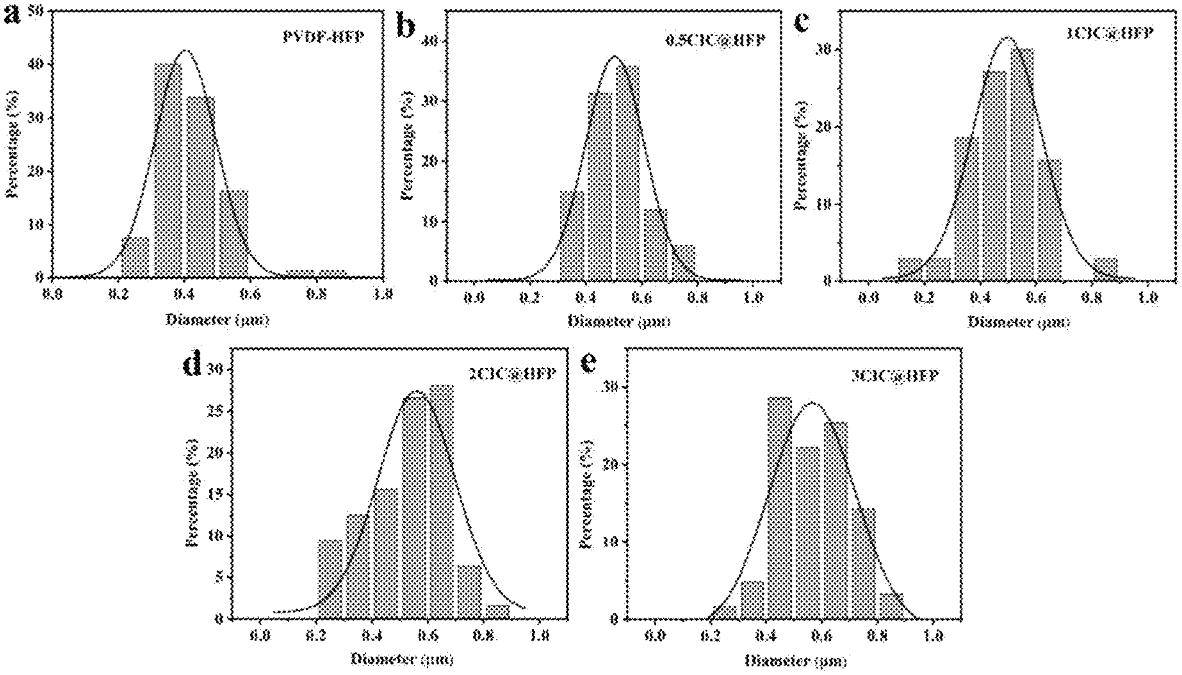
FIG. 13. The fiber diameter distribution of the CIC@HFP nanofibers with different CIC concentrations. a) PVDF-HFP nanofibers; b) 0.5CIC@HFP nanofibers; c) 1CIC@HFP nanofibers; d) 2CIC@HFP nanofibers; e) 3CIC@HFP nanofibers.
Figure 14:
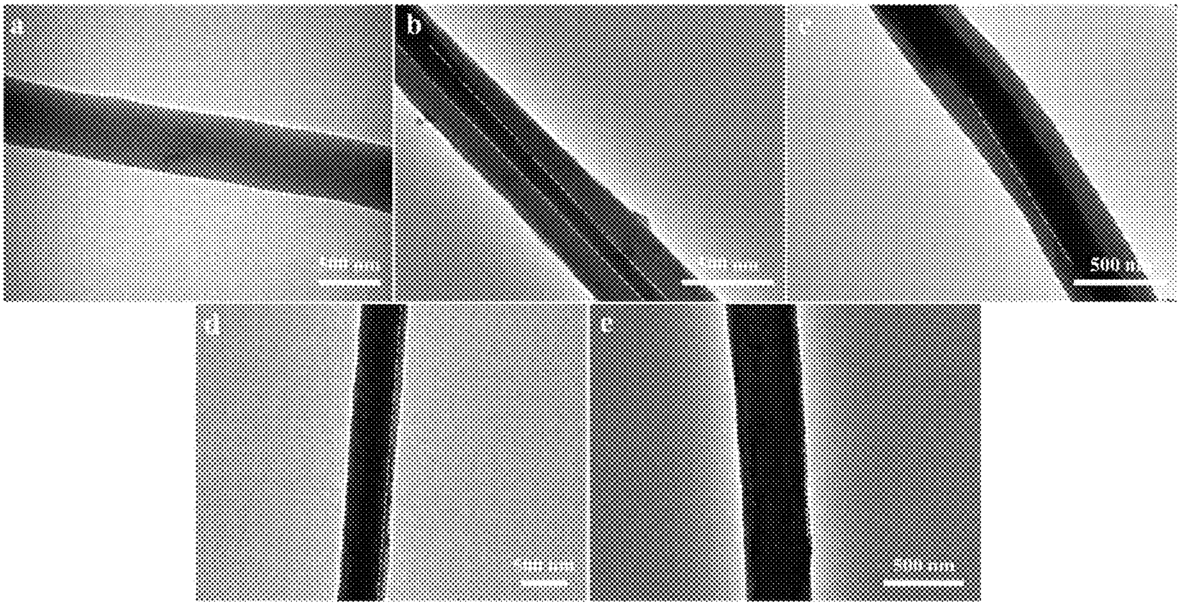
FIG. 14. The TEM images of the CIC@HFP nanofibers with variable CIC concentrations. a) PVDF-HFP nanofiber; b) 0.5CIC@HFP nanofiber; c) 1CIC@HFP nanofiber; d) 2CIC@HFP nanofiber; e) 3CIC@HFP nanofiber.

$Cs_2InCl_5(H_2O)$ possesses an orthorhombic structure in the Pnma space group (PDF no. 78-1822). Within this structure, the $[InCl_5H_2O]^{2-}$ octahedral units are formed as a result of the coordination between each In atom and five Cl atoms, alone with one water molecule (FIG. 2*a*). It could be observed that the binding between the octahedrons is relatively loose, indicating the vacancy-ordered double perovskite framework. The excellent crystallinity of $Cs_2InCl_5(H_2O)$ is confirmed by the powder X-ray diffraction (XRD) patterns depicted in FIG. 2*b*, which closely correspond to the standard PDF card (78-1822). The TEM image of $Cs_2InCl_5(H_2O)$ clearly displays the nanocrystals with size of 20-50 nm (FIG. 9). The $Cs_2InCl_5(H_2O)$ nanocrystals show good dispersibility in the PVDF-HFP solutions even after 48 h (FIG. 10). The microscopic and chemical structures of CIC@HFP films were also investigated in detail. FIG. 11 shows the optical picture of CIC@HFP electrospun film, demonstrating the uniformity, flexibility, and stretchability of as-prepared nanofibrous membrane. The microscopic SEM image of CIC@HFP NFs was shown in FIG. 2*c*, 1.5CIC@HFP NFs exhibit uniform fiber morphology with the average diameter of about 500 nm. As the content of perovskite nanocrystals increases, the proportion of large-size CIC@HFP fibers gradually increases and fibers become entangled together (FIG. 12, 13). The TEM image in FIG. 2*d* shows that 1.5CIC@HFP nanofiber has a core-shell structure with average core diameter of about 300 nm and average shell thickness of about 50 nm. The shell thickness of CIC@HFP NFs with different concentrations is shown FIG. 14. The shell thickness was increased to an average of about 155 nm for the 0.5CIC@HFP fiber, and then decreased to several nanometers for 3CIC@HFP fiber with higher content of perovskite nanocrystals (0.5CIC@HFP average core thickness: about 100 nm, average shell thickness: about 155 nm, 1CIC@HFP average core thickness: about 250 nm, average shell thickness: about 100 nm, 1.5CIC@HFP average core thickness: about 300 nm, average shell thickness: about 50 nm, 2CIC@HFP average shell thickness: about 40 nm, average core thickness: about 500 nm, and 3CIC@HFP average shell thickness: about 5 nm, average core thickness: about 550 nm). The FT-IR spectrum featured in FIG. 2*e* displays distinctive vibrational peaks that correspond to various phases of PVDF-HFP. Such phases include the nonpolar α-phase at the wavenumbers of 764 and 975 $cm^{-1}$, a superimposed β- and γ-phase at 840 $cm^{-1}$, and the polar β-phase at 1277 $cm^{-1}$. The peak intensity of α-phase at 764 $cm^{-1}$ was weakened with the addition of $Cs_2InCl_5(H_2O)$, while the peak intensity of β-phase was increased. Calculation of the electroactive phase content was performed using equation (1) following Beer-Lambert's law shown below:

$$F_E = \frac{I_E}{\left(\frac{k_{840}}{k_{764}}\right) * I_{764} + I_E} \tag{1}$$

Figure 15:
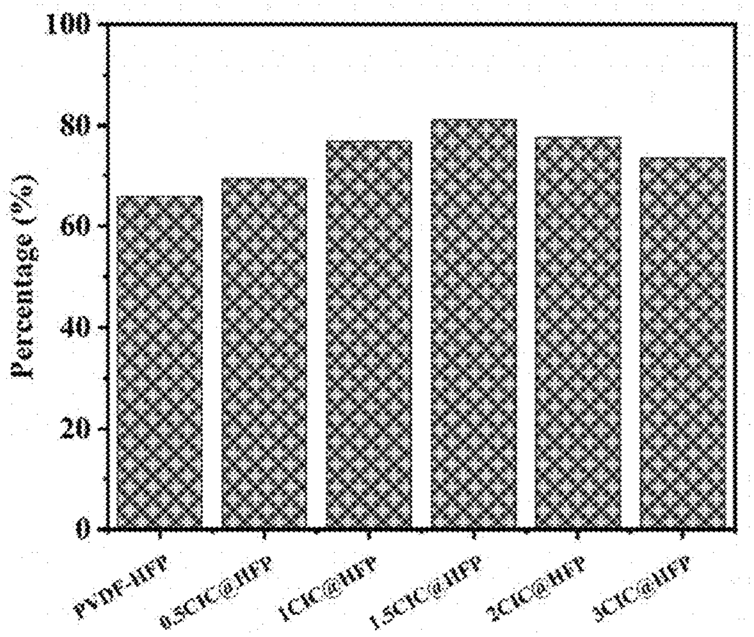
FIG. 15. The electroactive phase content of the CIC@HFP NFs.
Figure 16:
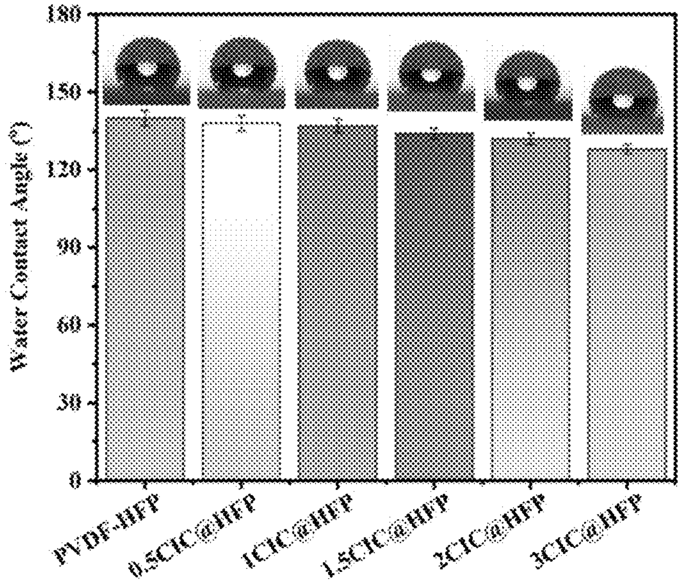
FIG. 16. The water contact angle of the CIC@HFP NFs.

The calculation involves equation (1), with $I_E$ and $I_{764}$ representing the absorbencies at 840 and 764 $cm^{-1}$, respectively. Meanwhile, $k_{840}$ and $k_{764}$ denote the absorption coefficients at the corresponding wavenumbers, with their respective values being $7.7\times10^4$ and $6.1\times10^4$ $cm^2$ $mol^{-1}$. 1.5CIC@HFP displays the highest electroactive phase content of 81.25%, notably higher compared to the pure PVDF-HFP, which can only achieve up to 65.9% electroactive phase (FIG. 15). The electroactive phase content of 0.5CIC@HFP, 1CIC@HFP, 2CIC@HFP, and 3CIC@HFP were 69.4%, 76.8%, 77.6%, and 73.6%, respectively. DSC results also display a similar relationship between perovskite content and crystalline phase, as illustrated in FIG. 2*f*, matching well with the FT-IR results. The melting temperature ($T_m$) of CIC@HFP NFs was improved from 100.7° C. of pristine PVDF-HFP nanofibers to 101.5° C. of 1.5CIC@HFP NFs, indicating the increase in the mutual nucleating forces between PVDF-HFP chains and perovskite nanocrystals and the increase of fiber crystallinity. The XRD patterns of the CIC@HFP NFs show the characteristic peaks of $Cs_2InCl_5(H_2O)$ and the typical β phase peak (2θ=) 20.3° of PVDF-HFP, with the highest intensity of the 1.5CIC@HFP nanofibers (FIG. 2*g*). These results confirm that moderate $Cs_2InCl_5(H_2O)$ content can dramatically promote the electroactive phase of PVDF-HFP. The mechanical properties and breathability of CIC@HFP nanofibrous films are also investigated. The blending ratio of $Cs_2InCl_5(H_2O)$ has a significant influence on the tensile strength of CIC@HFP nanofibrous membranes, as depicted in FIG. 2*h*. It is observed that the breaking strength of the nanofibers was enhanced from 10.1 MPa in the PVDF-HFP nanofibers to 14.2 MPa in the 1.5CIC@HFP nanofibers. This can be ascribed to the hydrogen bonding effect between the PVDF-HFP chains and the —OH bonds of $Cs_2InCl_5(H_2O)$, resulting in improved mechanical properties. The breathability of the fabricated nanofibers was assessed by characterizing the air permeability (AP) and water vapor transfer rate (WVTR), as shown in FIG. 2*i*. The excellent AP and WVTR performance are comparable to those of previous reports and the commercial e-PTFE membrane (FIG. 26), which can be attributed to the porous fibrous network architecture. Specifically, the 1.5CIC@HFP nanofibers exhibit superior WVTR and AP values at 25° C. and 50% relative humidity (RH), with an ability to achieve over 18.0 kg $m^{-2}$ $d^{-1}$ and approximately 4.3 ml $s^{-1}$, respectively. The hydrophobicity of the CIC@HFP nanofibrous films was evaluated by the water contact angle test. The prepared membrane had good hydrophobicity with the contact angle over 125°, and the contact angle decreased slightly with the increase of $Cs_2InCl_5(H_2O)$ content (FIG. 16). Furthermore, FIG. 2*j* demonstrates the excellent biocompatibility and cytotoxicity of the CIC@HFP NFs by NIH 3T3 and no dead cells were found in different cell culture stages with the different concentrations of $Cs_2InCl_5(H_2O)$ content in CIC@HFP NFS, which should be ascribed to the non-toxic lead-free perovskite nanocrystals in comparison with the traditional lead containing perovskites. FIG. 2*k* shows the cell proliferation capability by CCK-8 test, unveiling the good cellular multiplication of CIC@HFP NFs. These results prove that the CIC@HFP NFs have good breathability, mechanical strength, and biocompatibility towards the wearable energy harvesting and sensing devices.

Figure 3:
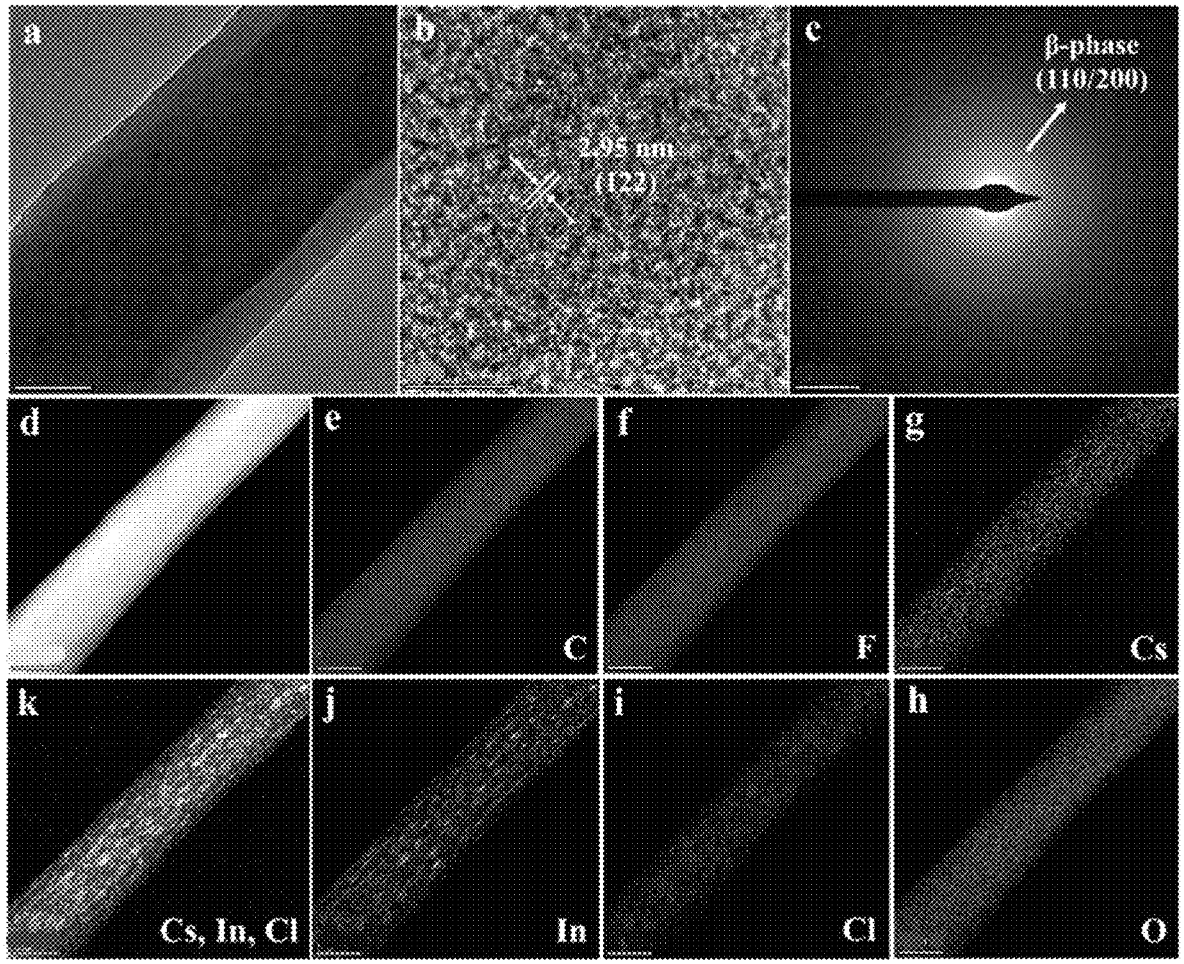
FIG. 3. The microstructure and composition analysis of CIC@HFP NFs. a) HRTEM image of the CIC@HFP NFs. b) HRTEM image of the $Cs_2InCl_5(H_2O)$ nanocrystals within CIC@HFP NFs. c) SAED patterns of CIC@HFP NFs. d) HADDF image of the CIC@HFP NFs. e-j) The element mapping of the CIC@HFP nanofiber with corresponding elements. k) The superimposed mapping image of Cs, In, Cl elements. I) FT-IR spectrum of the CIC@HFP NFs. m) High-resolution XPS spectrum of O 1s. n) High-resolution XPS spectrum of F 1s.
Figure 3:
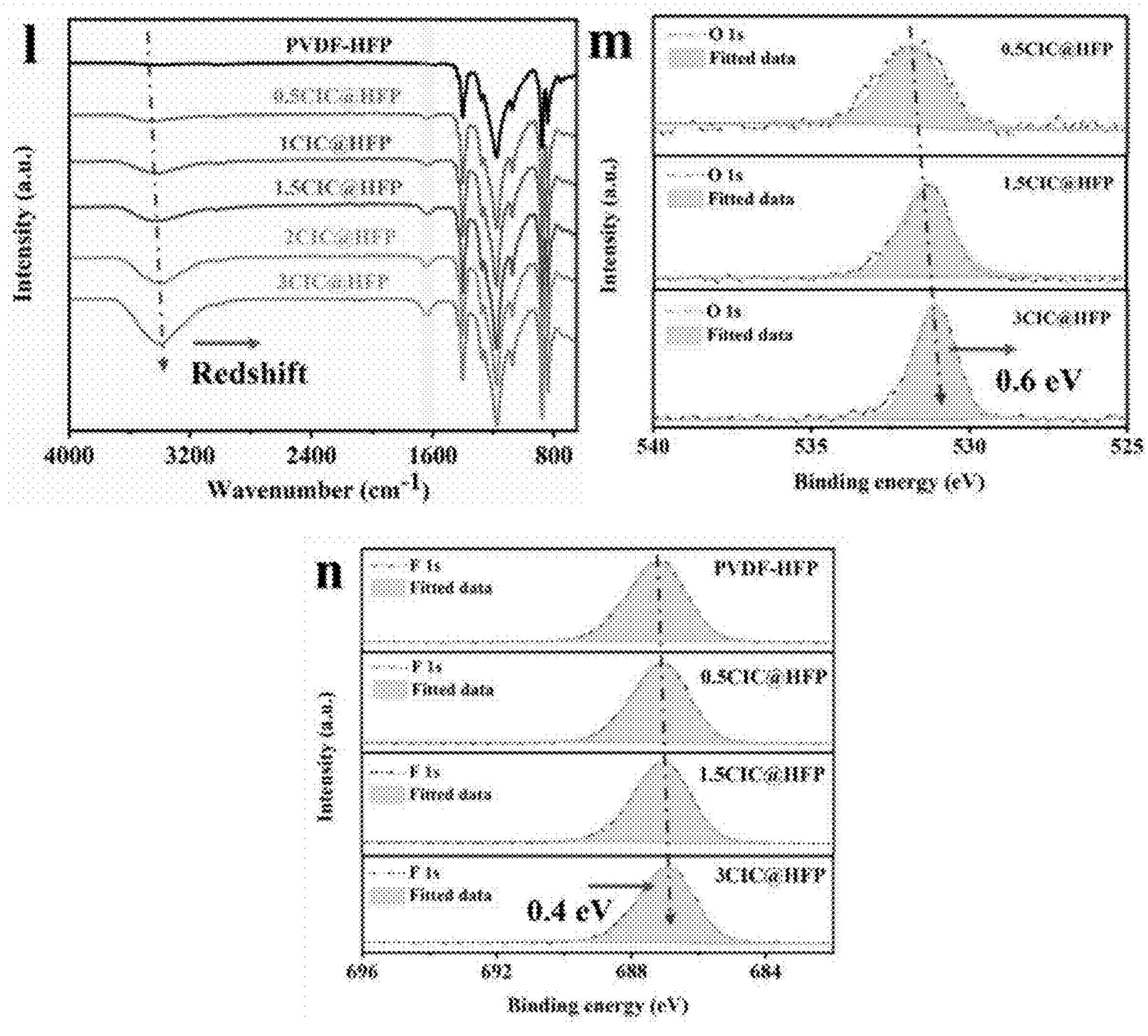
Figure 17:
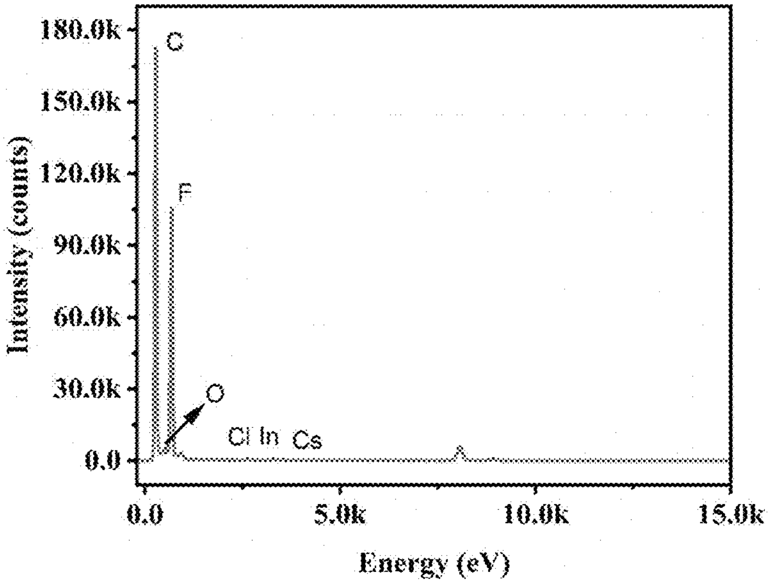
FIG. 17. The EDS spectrum of the 1.5CIC@HFP nanofiber.
Figure 18:
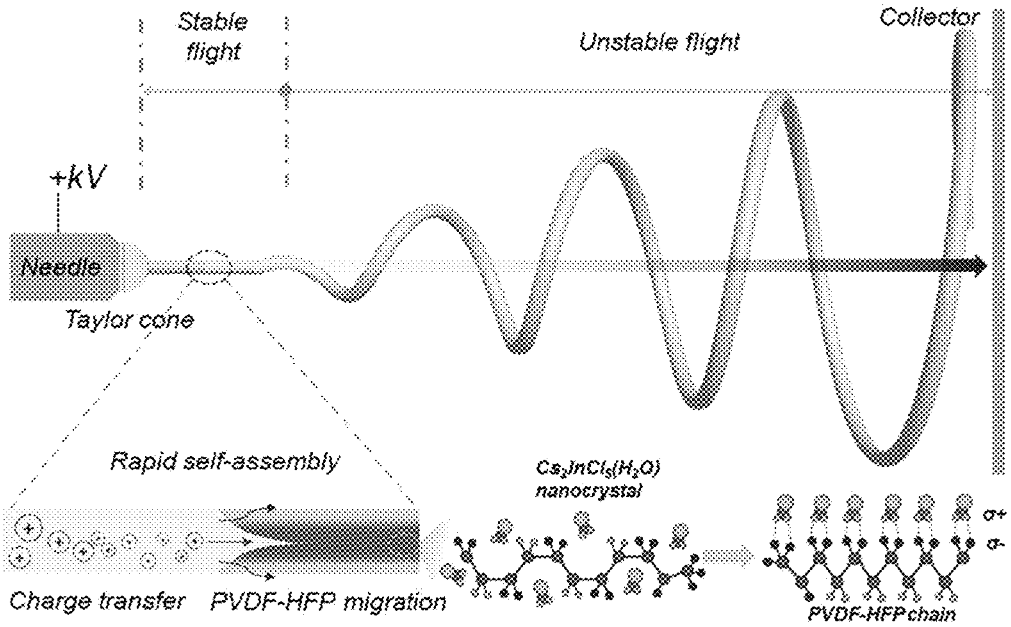
FIG. 18. The schematic illustration of the spinning process and microscopic core-shell structure formation in accordance with certain embodiments described herein.

To explore this core-shell structure of CIC@HFP, we further analyzed the microstructure of nanofiber under high resolution. FIG. 3*a* shows the high-resolution TEM (HRTEM) image of CIC@HFP nanofiber with core-shell structure. In FIG. 3*b*, the HRTEM image shows the ultrasmall $Cs_2InCl_5(H_2O)$ nanocrystals, the lattice spacing corresponds to the (122) crystal plane. In the selected area electron diffraction (SAED) map of the crystal region in CIC@HFP (FIG. 3*c*), the presence of diffraction ring related to the β phase (110, 200) of PVDF-HFP was observed. This observation substantiated the crucial part played by the —OH . . . F dipole in facilitating the β-phase crystallization in the nanofibers. The high-angle annular dark-field scanning TEM (HADDF-STEM) was conducted to investigate the fiber structure, the apparent contrast between light and dark area in the image further confirmed the core-shell structure of the nanofibers (FIG. 3*d*). FIG. 3*e-k* displays the EDS of the CIC@HFP nanofiber with corresponding elements of "Cs", "In", "Cl", "O", "C", and "F", further confirming the co-existence of these elements in the nanofibers. The quantitative analysis of element content is shown in FIGS. 17 and 25. It could be seen that the $Cs_2InCl_5(H_2O)$ nanocrystals are enriched in the core area of the superimposed mapping image of Cs, In, Cl elements, mainly due to the hydrogen bond interaction between $Cs_2InCl_5(H_2O)$ and PVDF-HFP, and the core-shell structure can also be clearly distinguished from the image (FIG. 3*h*). The result was also consistent to the TEM images in FIG. 14, indicating the enriched perovskite nanocrystals in the core fiber area. FIG. 31 shows the FT-IR spectrum of the CIC@HFP nanofibrous membranes, the FT-IR spectrum clearly demonstrates that the broad band at 3150-3650 $cm^{-1}$ and the peak at 1640 $cm^{-1}$ represent the typical stretching vibration and bending vibration of O—H bond from the CIC@HFP, respectively. As the content of $Cs_2InCl_5(H_2O)$ nanocrystals increased from 0.5% to 3%, the peak of —OH was redshifted from 3454 $cm^{-1}$ to 3402 $cm^{-1}$. It can be explained that the overall electron cloud density is reduced due to the formation of hydrogen bonds between the —OH from nanocrystals and —CF bonds of PVDF-HFP, demonstrating that the hydrogen bonding increased. The XPS measurement was also conducted to obtain the high-resolution O 1s and F 1s spectra. In FIG. 3*m*, it can be observed that the binding energy of O 1s shifted from 531.8 eV of 0.5CIC@HFP to 531.2 eV of 3CIC@HFP. Additionally, a decrease in the binding energy of F Is was noted from 687.3 eV of PVDF-HFP to 686.9 eV of 3CIC@HFP (FIG. 3*n*). The result demonstrates that the —OH bonds in $Cs_2InCl_5(H_2O)$ and the —F group in PVDF-HFP interact with each other to form the hydrogen bonds, thereby reducing the binding energy of O 1s and F 1s. Therefore, this process can be interpreted as the formation of stable oriented hydrogen bonds of O—H . . . F between the oriented hydroxyl group and the negatively charged-CF bond in PVDF-HFP under the electric field, and first emerge from the pinhole to form the core by the charge transfer, while PVDF-HFP migrates to the nanofiber surface to form a continuous shell because of its low surface energy (FIG. 18).

Figure 4:
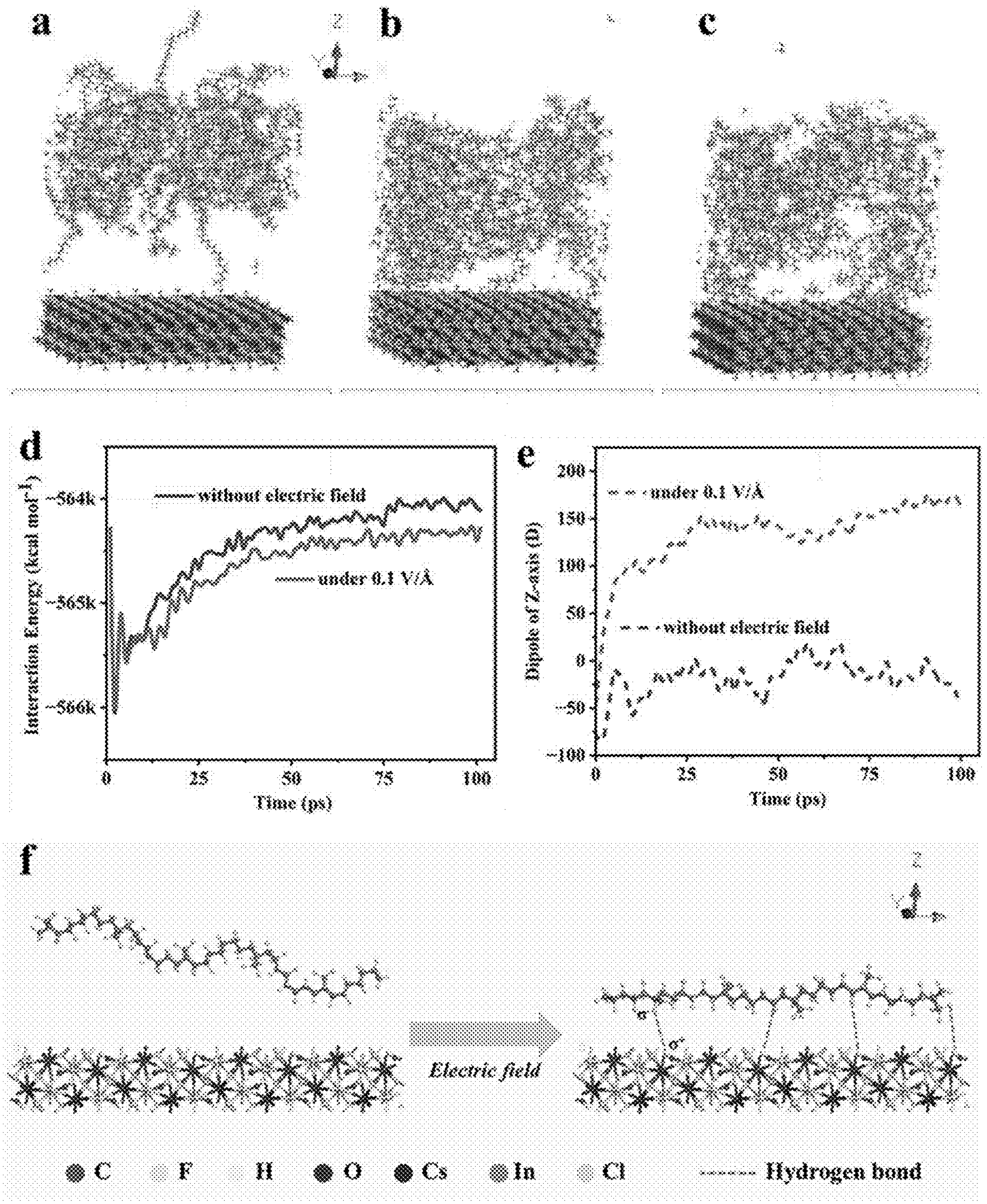
FIG. 4. The molecular dynamics (MD) simulation of mutual interaction between the PVDF-HFP chains and the $Cs_2InCl_5(H_2O)$ nanocrystals. a) Initial snapshot for MD simulation of the polarization of PVDF-HFP chains on the $Cs_2InCl_5(H_2O)$ supercell. b) Final snapshot for the PVDF-HFP chains on the $Cs_2InCl_5(H_2O)$ supercell without electric field. c) Final snapshot for the PVDF-HFP chains on the $Cs_2InCl_5(H_2O)$ supercell under the electric field. d) The interaction energy of PVDF-HFP chains on the $Cs_2InCl_5(H_2O)$ supercell. e) Dipole of Z-axis under the electric field. f) The proposed interaction mechanism of PVDF-HFP chains and $Cs_2InCl_5(H_2O)$ nanocrystals.

We further explored the interaction effect of $Cs_2InCl_5(H_2O)$ and PVDF-HFP polymer chains in the electrospinning process by molecular dynamics, as shown in FIG. 4*a-c*. It can be observed that the $Cs_2InCl_5(H_2O)$ nanocrystals have mutual attraction with the PVDF-HFP polymer chains and the effect is enhanced when an electric field is applied axially. This can be ascribed to the fact that H atoms in the nanocrystals will be oriented and tend to carry the positive charge under the electric field, which can produce strong intermolecular interaction with the negatively charged-CF2 group in the PVDF-HFP chains through hydrogen bonding and dipole interaction. FIG. 4*d* shows the interaction energy change between the $Cs_2InCl_5(H_2O)$ nanocrystals and PVDF-HFP polymer chains increases under the electric field of the electrospinning process, which is mainly caused by the hydrogen bonding effect between the —OH and —F bonds. We also calculated the axial dipole with or without the application of electric field, and found that the axial dipole is greatly enhanced under the electric field. Obviously, the PVDF-HFP chains interacting with the $Cs_2InCl_5(H_2O)$ nanocrystals after 100 ps can achieve the enhanced polarization of 161.9 D under electrical poling of electrospinning process while the polarization is very low in the absence of electric field, which further proves that the polar β phases in CIC@HFP nanofibers are increased during electrospinning (FIG. 4*e*). Therefore, the —OH group in $Cs_2InCl_5(H_2O)$ nanocrystals and the —F group in PVDF-HFP will strongly interact with each other by electrostatic attraction and hydrogen bonding to achieve the anchoring of polymer chains on the surface of nanocrystals under the electric field of electrospinning. The constant tensile force during electrospinning causes the PVDF-HFP chains to be uniaxial stretched, resulting in the in-situ formation of ordered OH—CF2 dipoles, which greatly promotes the growth of core-shell structure and the polarized phases, as summarized in FIG. 4*f*. The boosted electroactive phase content will be beneficial for the TENG performance.

Figure 5:
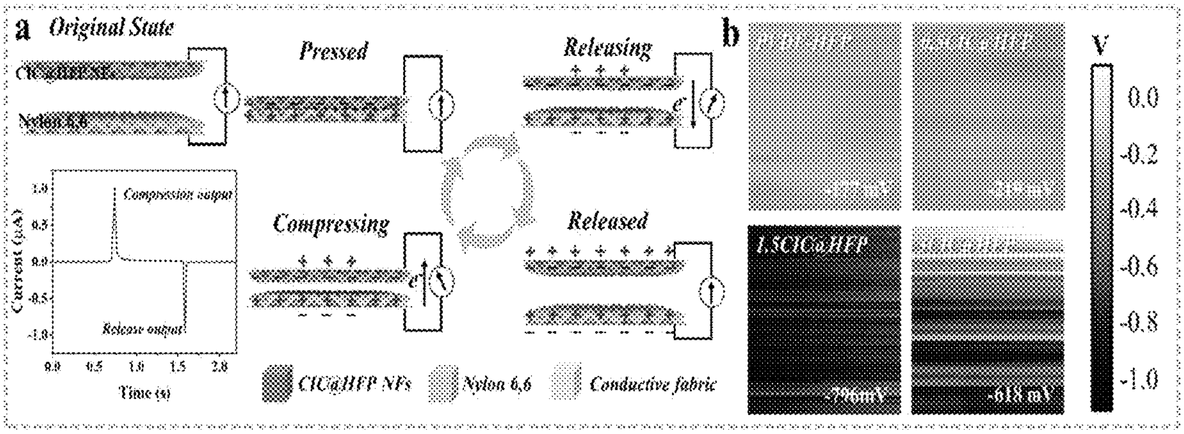
FIG. 5. The output performance of the CIC@HFP NFs based TENG. a) Schematic diagram of the working principle of CIC@HFP NFs based TENG. b) Surface potential of pristine PVDF-HFP and CIC@HFP NFs with different contents of $Cs_2InCl_5(H_2O)$ measured by KPFM, scale bar, 25 μm. c-e) The open-circuit potential, current, and charge variations of TENG based on different CIC@HFP NFs under 20 N. f-h) The open-circuit potential, short-circuit current, and charge variations of nylon 6,6//CIC@HFP TENG under different pressure forces. i) Voltage, current, and power density curves at different resistance. j) The stability test of TENG for running 10000 cycles.
Figure 5:
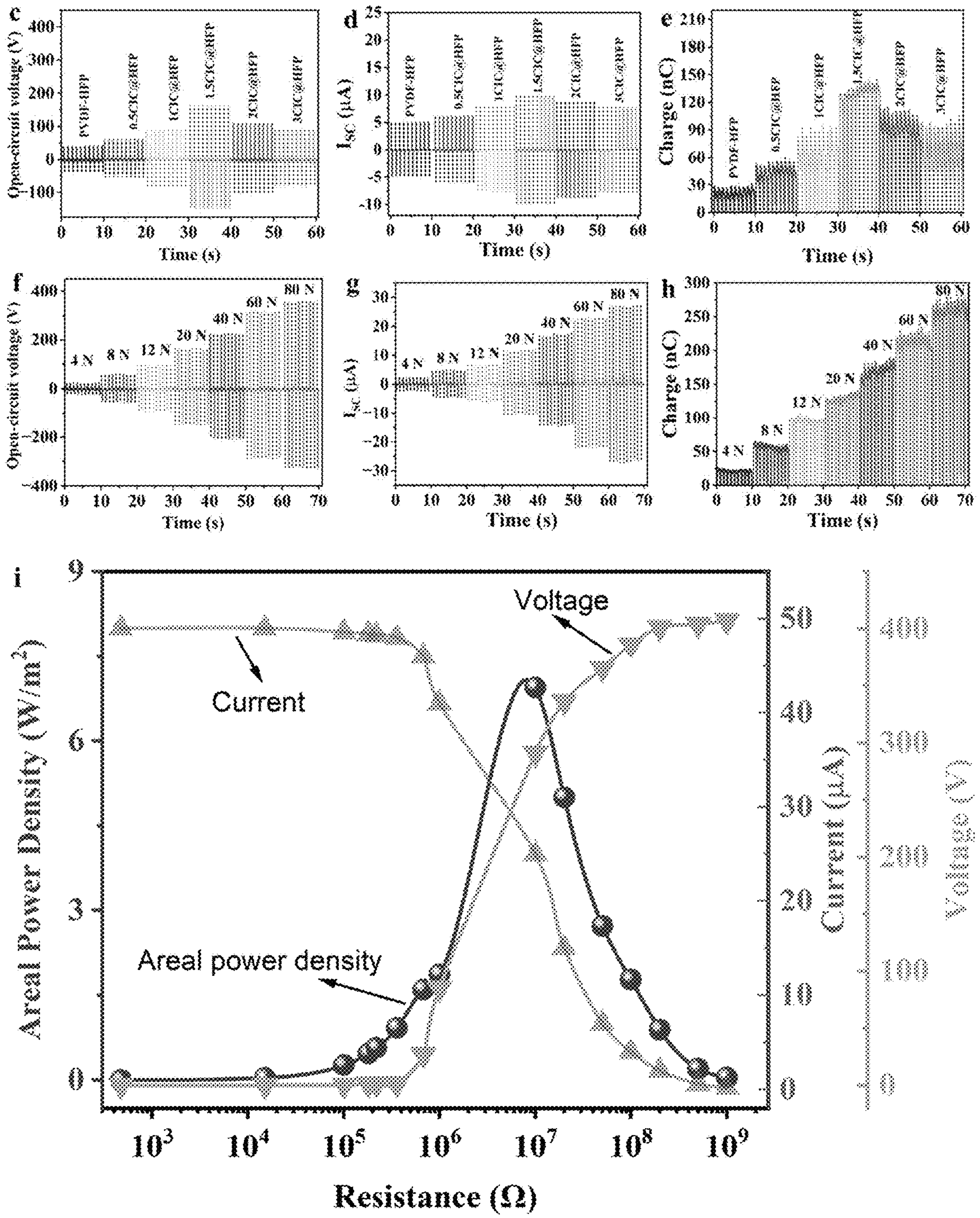
Figure 5:
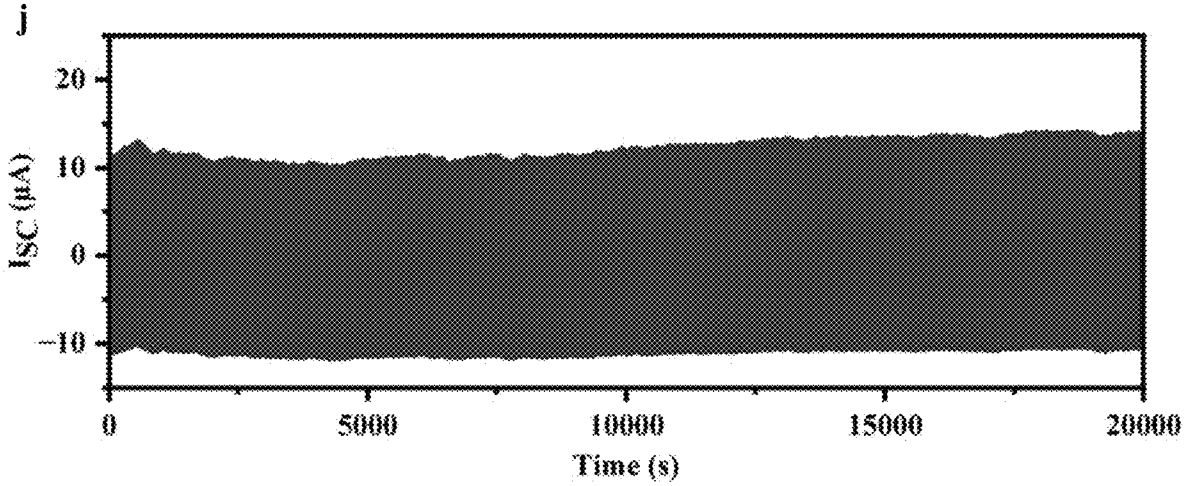
Figure 19:
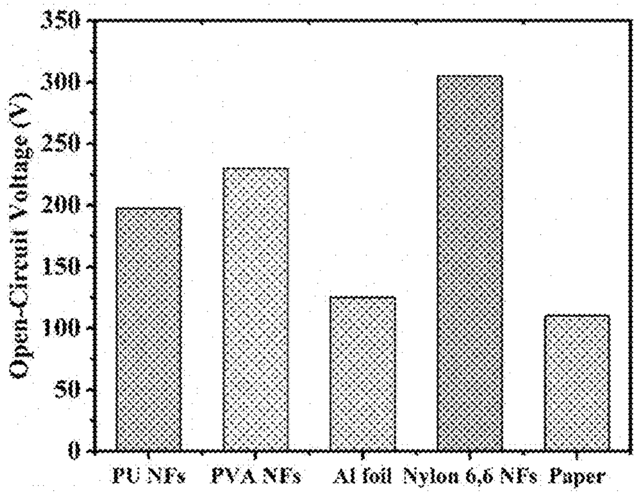
FIG. 19. The peak output voltage of the CIC@HFP NFs pairing with different electropositive materials in accordance with certain embodiments described herein.
Figure 20:
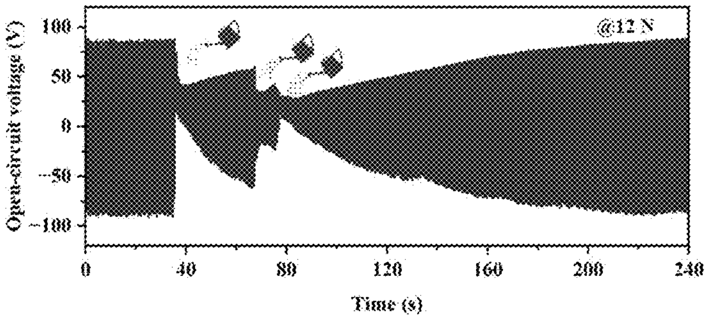
FIG. 20. The influence of water spraying treatment on the TENG performance.
Figure 21:
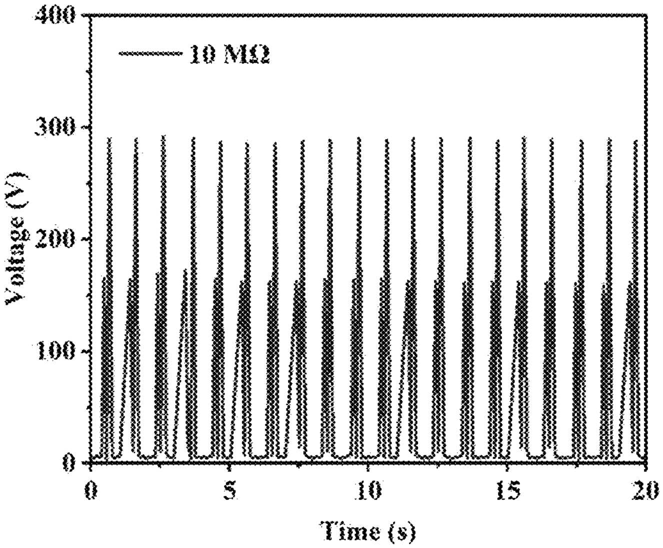
FIG. 21. The peak output voltage waveform measured at 10 MΩ.

Based on the properties and electroactivity of CIC@HFP NFs, we further investigated its performance for the TENGs. The schematic illustration is depicted in FIG. 5*a*, in the two-electrode mode TENG, the configuration consists of CIC@HFP NFs as one of the triboelectric layers and nylon 6,6 (or other electropositive materials) as the other layer. When the CIC@HFP membrane comes into contact with the nylon 6,6 nanofibers, the transfer of charges occurs from the nylon 6,6 nanofibers to the CIC@HFP NFs. After that, the electric potential difference will be generated when the relative separation between the two layers happens. Herein, the alternating electricity (AC) output is continuously produced through whole contact-separation cycle. Surface potential was measured utilizing Kelvin probe force microscope (KPFM) firstly to investigate the increased charge density by introducing the $Cs_2InCl_5(H_2O)$ nanocrystals. FIG. 5*b* shows the surface potential of pure PVDF-HFP and CIC@HFP NFs with different concentrations of $Cs_2InCl_5(H_2O)$ nanocrystals. The surface potential of pristine PVDF-HFP was measured to be ~-177 m V. After adding different concentrations of CIC nanocrystals, the surface potential of 1.5CIC@HFP NFs reached a maximum value of −796 mV because of the highest electroactive phase content. While the surface potential of the 3CIC@HFP NFs subsequently decreased to −618 mV, which was mainly due to the decreased electroactive phase content as discussed above, resulting in the charge loss. The results demonstrate that more negative charges will be transferred to the nylon 6,6 membrane during pairing with 1.5CIC@HFP NFs. By comparing the properties of different electropositive materials, it can be seen that nylon 6,6 nanofibers as the positive electrode can reach the maximum open-circuit voltage of 310 V under a pressure of 20 N (FIG. 19). Therefore, in the following performance tests, we adopt CIC@HFP//nylon 6,6 TENG as the test object. Firstly, the properties of CIC@HFP films with different addition ratios of $Cs_2InCl_5(H_2O)$ nanocrystals were tested and compared. It was found that under the addition ratio of 1.5%, the output performance of TENG was the highest, reaching 310 V, which was about 3.26 times that of pure PVDF-HFP nanofibers (FIG. 5*c*-*e*). However, with the increase of the content of $Cs_2InCl_5(H_2O)$ nanocrystals, the output performance of TENG will gradually decrease, which is mainly caused by the decrease of crystalline electroactive phase. Furthermore, the larger diameter of the CIC@HFP nanofibers results in a reduced contact area during the contact-separation processes. We also evaluated the output properties of the 1.5CIC@HFP//nylon 6,6 TENG at different pressure forces (FIG. 5*f*-*h*). The observations demonstrate that the output properties increase linearly with the enhanced pressure. The TENG can reach the maximum output of 681 V, 53.1 μA, and 278 nC under the pressure of 80 N. By spraying water repeatedly on CIC@HFP NFs during operation to evaluate the effect of humidity on the TENG, it was found that the open-circuit voltage of the TENG rapidly decays and then recovers by a period of water-molecule evaporation. The result shows that the hydrophobic CIC@HFP membrane has good humidity-resistance and good protection on the humidity-sensitive perovskite nanocrystals in the core area (FIG. 20). Power density (P) was quantified from measuring the voltage and current over the external resistance range of 470 Ω~1Ω. The calculation of P is performed using the following Equation (2):

$$P = \frac{I^2 R}{A} \tag{2}$$

wherein I stands for the TENG output current, A represents the contact area of TENG, and R denotes the load resistance. When the external load resistance is 10 MΩ in the rectifier circuit, the peak output power reaches the instant maximum P value of 6.94 W $m^{-2}$ and the peak voltage of 291 V relative to the external load (FIG. 5*i*). The peak output voltage waveform measured through 10 MΩ is displayed in FIG. 21. In addition, the long cyclic stability of the TENG was further investigated, the current did not show any decay after 10,000 cycles at 0.5 Hz (FIG. 5*j*), proving its good mechanical durability.

Figure 6:
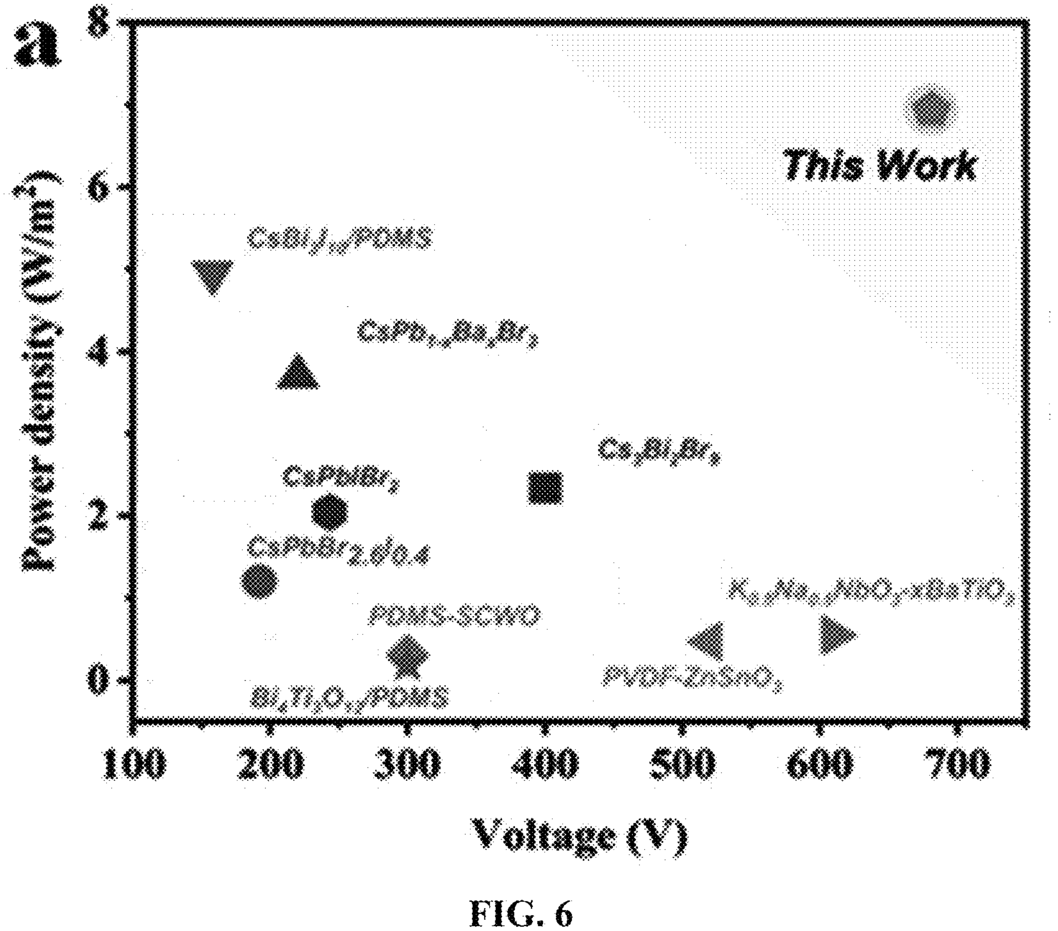
FIG. 6. The practical application of the TENG for biomechanical energy harvesting and self-powered monitoring. a) The power density-voltage plots of as-fabricated TENG and related reports. b) The equivalent circuit diagram for the charging system by the TENG. c) Optical photo of lighting the "CITYU" patterned LEDs by as-fabricated TENG. d) The charging curves for different capacitors by TENG. e) Charging-discharging curve of the stable working of the stopwatch by the capacitor (22 μF). f) The generated voltage and signal response of the different finger motions. g) The generated voltage and signal response of the wrist bending, elbow bending, and walking. h) The charging-working discharge of the stopwatch and the calculator by the walking generated electricity. i) Optical images of powering calculator calculation (I-IV) by collecting walking energy.
Figure 6:
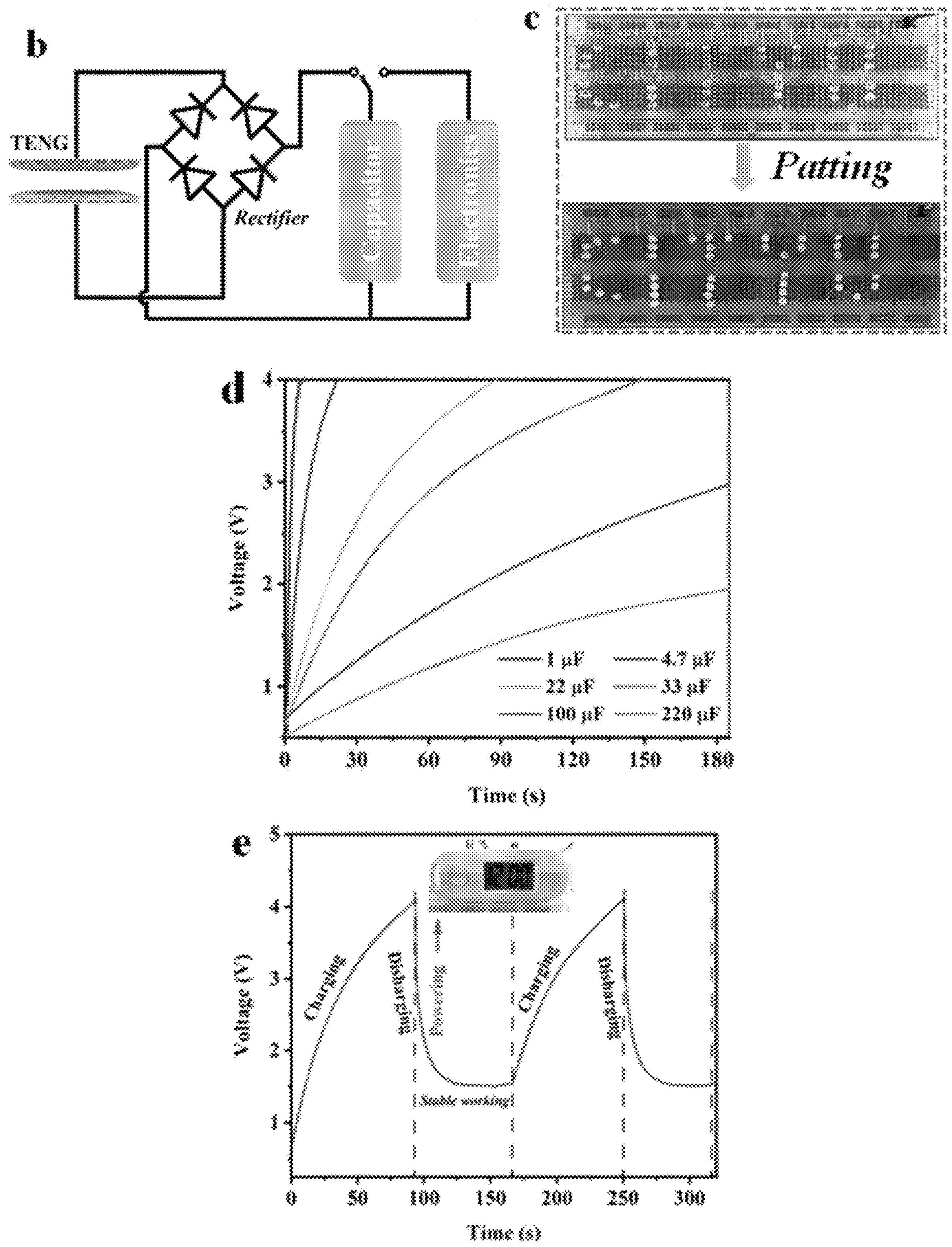
Figure 6:
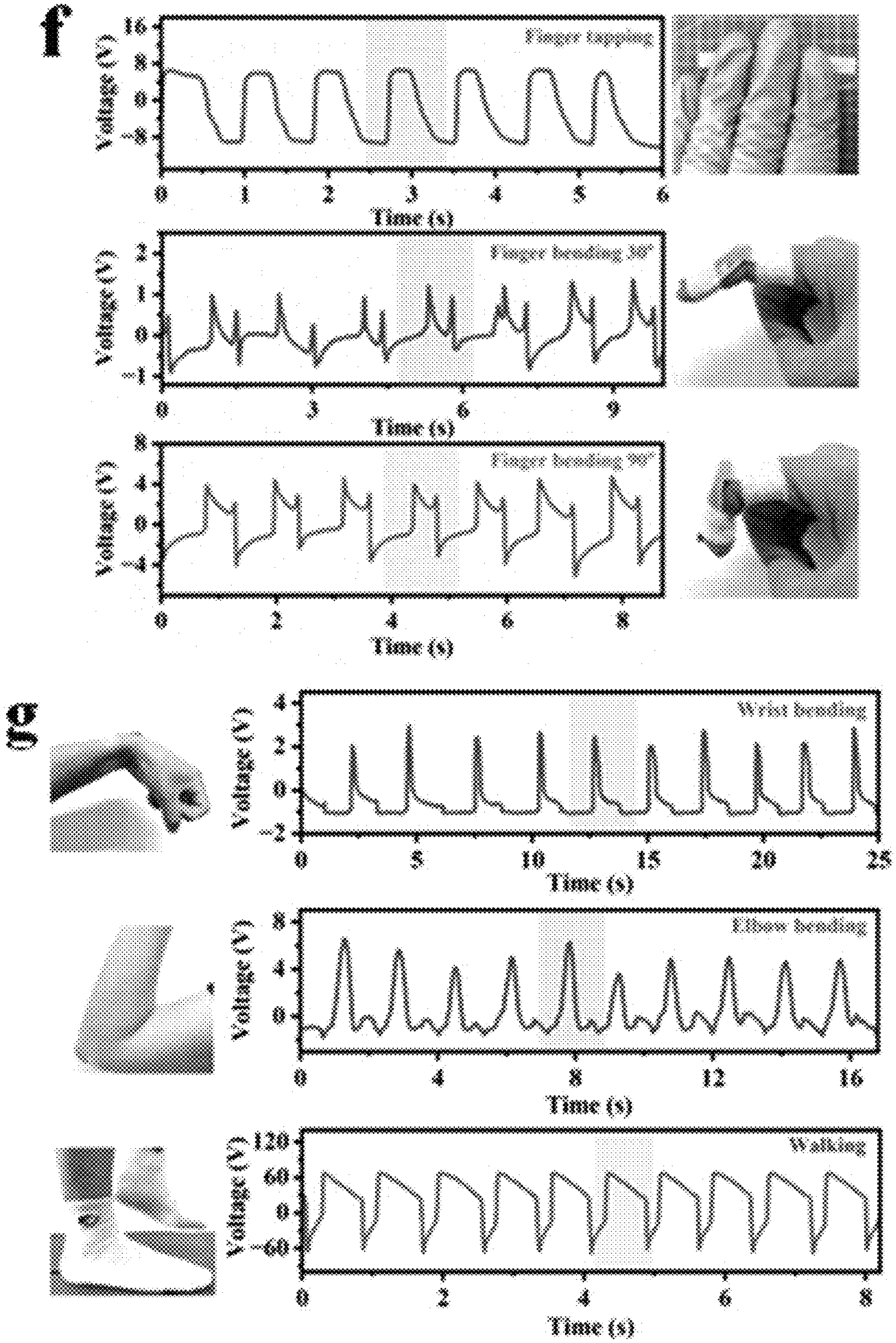
Figure 6:
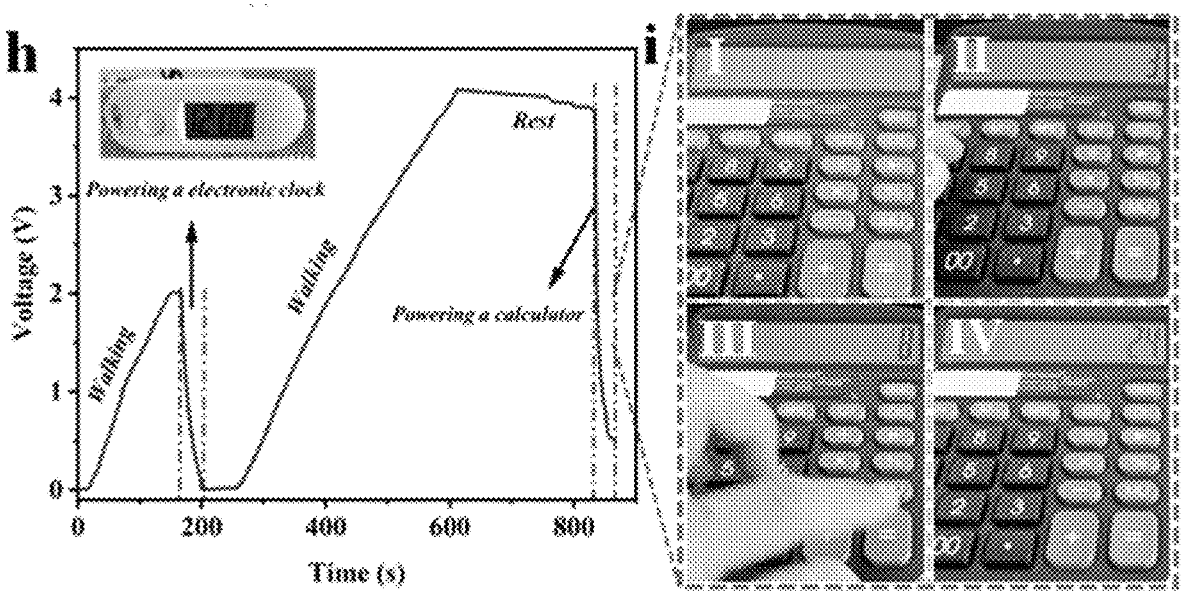
Figure 22:
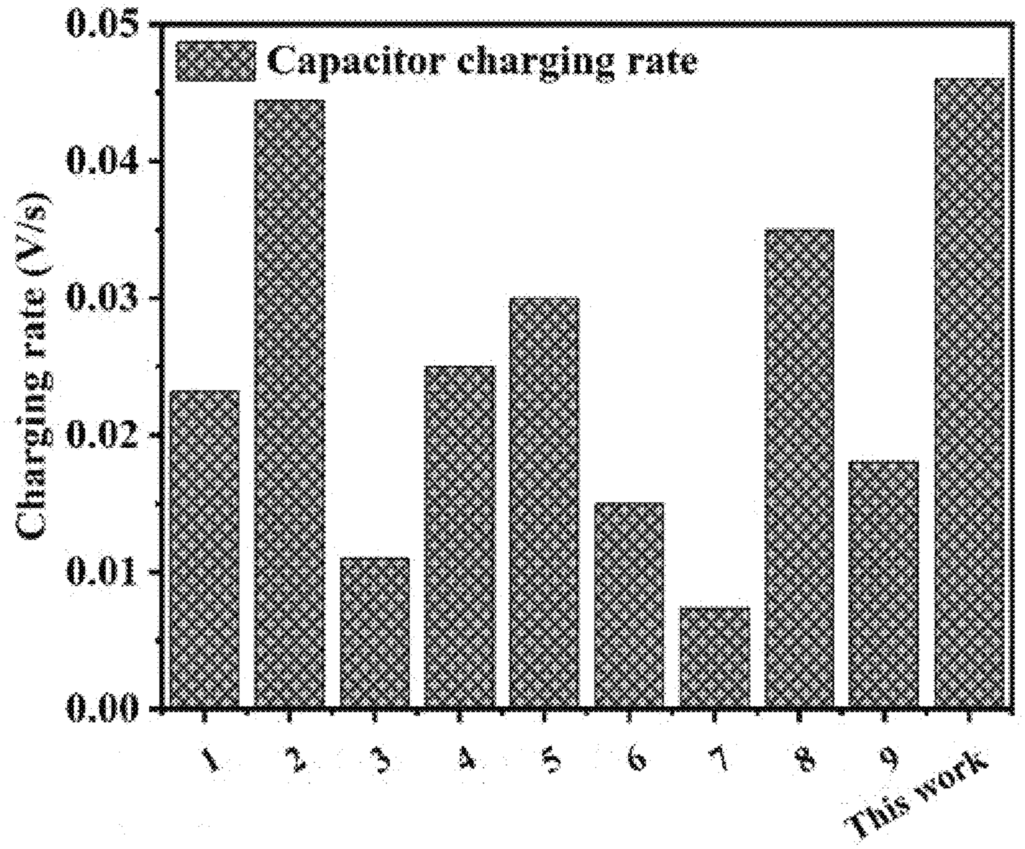
FIG. 22. Comparison of the charging speed for the capacitor (22 μF) by CIC@HFP//nylon 6,6 TENG and previous reports.

As-fabricated TENG showed exceptional output performance, surpassing other TENGs based on perovskites. Its excellent performance makes it a suitable power source for wearable electronics (FIGS. 6*a* and 27). The practical application of the as-prepared CIC@HFP//nylon 6,6 TENG to harvest mechanical energy was further evaluated, commercial capacitors were integrated into the circuit to accumulate the electric energy. The alternate current produced from the TENG was converted to the direct current using a bridge diode, allowing the commercial capacitor to be charged, and the capacitor was used to power the electronics subsequently (FIG. 6*b*). In FIG. 6*c*, when the TENG was connected to the circuit and tapping the TENG with the motor at 1 Hz, the green LEDs serially connected in the characters "CITYU" lighted up successfully, demonstrating that TENG is capable of collecting mechanical energy. To exhibit the self-powered properties for stably driving electronics, TENG charges different commercial capacitors at 1 Hz under an external force of 20 N (FIG. 6*d*). Various commercial capacitors were charged within 180 s, including 1, 4.7, 22, 33, 100, and 220 μF capacitors, respectively. When the capacity was increased from 1 μF to 33 μF, the time to charge the capacitor to 4 V increased from 3.9 s to 148.5 s. Capacitors of 100 μF and 220 μF could also be charged to 3 V and 1.9 V in 180 s. It should be noted that the TENG exhibited a significantly higher charging speed compared to the majority of previous studies, as shown in FIG. 22. The 22 μF capacitor was utilized to be charged and then to operate the stopwatch by an equivalent circuit (FIG. 6*e*). At first, the capacitor voltage linearly increased to 4 V in 93.6 s, the electronic stopwatch can stably work by continuous press-release of the TENG, demonstrating the sufficient driving ability of the stopwatch by the TENG. We further used the prepared TENG to detect the motions and harvest the energy generated by the fingers and joints of the human body (FIG. 23). The minute motions (breathing and swallowing) can generate the short-circuit current of about 1~4.5 nA with reproducible signals by attaching the TENG on the throat (FIG. 24). The prepared TENG showed excellent signal response and voltage output to major finger and joint movements. We tapped the TENG to generate an open-circuit voltage of about 15 V. For different bending angles of the finger joints, the TENG generates similar voltage signals every time. As the bending angle increases to 90°, the resulting open-circuit voltage increased from 2 V to 8 V (FIG. 6*f*). This is attributed to the increase in the contact area between the positive and negative triboelectric electrodes of the TENG as the bending angle increased. For wrist and elbow movements, the TENG can also produce specific signal signature peaks, as well as stable and repeated open-circuit voltages from 3 V to 8 V. By attaching the TENG to the bottom of the foot, the TENG can collect the biomechanical energy of walking, and the resulting open-circuit voltage can reach 130 V (FIG. 6*g*). In addition to the different scale of signal output generated by these body actions, these signals also have corresponding specificity, enabling efficient and non-invasive physiological signal health monitoring. As a demonstration, the biomechanical energy of walking (about 1 Hz) was harvested by the above circuit, the capacitor can be charged to 2 V in 151 s and then utilized to power the stopwatch for about 10 s (FIG. 6*h*). Then the capacitor was further charged to 4 V in 353 s by walking, the stored electricity can power the calculator working for normal multiplication calculation over 15 s (FIG. 6*i*). Herein, as-fabricated CIC@HFP//nylon 6,6 TENG showed great potential of practical applications in wearable energy harvesting devices.

Conclusion

In summary, the core/shell and biocompatible $Cs_2InCl_5(H_2O)$@PVDF-HFP nanofibers (CIC@HFP NFs) fabricated by one-step electrospinning method were proposed and demonstrated. By utilizing the lead-free $Cs_2InCl_5(H_2O)$ as an inducer, CIC@HFP NFs exhibited β-phase-enhanced and self-aligned nanocrystals within the uniaxial direction. This enables the transformation of the nonpolar α-phase, which has randomly oriented dipoles, into the polarized phase with uniform dipoles oriented by the fiber direction. The interface interaction was further investigated by the experimental measurements and molecular dynamics, which revealed that the hydrogen bonds between the $Cs_2InCl_5(H_2O)$ and PVDF-HFP induced the automatically well-aligned dipoles and stabilized the β-phase in the CIC@HFP NFs. As a result, the fabricated CIC@HFP//nylon 6,6 TENG displays substantially significant improvement in output voltage (681 V), output current (53.1 μA) and peak power density (6.94 W $m^{-2}$), with the highest reported output voltage among TENGs based on halide-perovskites. The energy harvesting and self-powered monitoring performance was further substantiated by physiological motions, showcasing its ability to charge capacitors and effectively operate electronics such as commercial LEDs, stopwatch, and calculator, demonstrating its promising application in biomechanical energy harvesting and self-powered sensing.

EXPERIMENTAL SECTION

Materials

The materials are listed as follows: Poly(vinylidene fluoride)-co-hexafluoropropylene (PVDF-HFP, average Mw: ~400,000) was provided by Sigma-Aldrich. Hydrochloric acid (HCl, 37%), Dimethylformamide (DMF) and acetone were purchased from Aladdin Bio-Chem Technology Co., Ltd (Shanghai). Nylon 6,6 (pellets, MW: 262.35), Cesium chloride (CsCl, AR), and Indium chloride ($InCl_3$, AR) were purchased from the Macklin Biochemical Co., Ltd (Shanghai). All chemicals in experiments were received without any treatment.

Preparation of $Cs_2InCl_5(H_2O)$ $Cs_2InCl_5(H_2O)$ was prepared by the ambient coprecipitation crystallization method. For a typical synthesis, 1 mmol $InCl_3$ were dissolved in Teflon autoclave with 15 mL of 37% hydrochloric acid and stirred until the solution became clear. Then 4 mmol of CsCl was added to precipitate $Cs_2InCl_5(H_2O)$ as a white powder. All products were centrifuged and washed with ethanol and then dried via vacuum oven at 60° C.

Preparation of CIC@HFP Nanofibers

To begin with, the $Cs_2InCl_5(H_2O)$ nanocrystals and PVDF-HFP pellets were dissolved in the mixed DMF: acetone (5:5, wt. %) solution with vigorous stirring at 50° C. for a duration of 6 hours. This resulted in the preparation of a mixture solution with a total concentration of 20% (wt./wt.). Subsequently, the well-blended solution was collected using an injector equipped with an injection needle, making it ready for the electrospinning. The negative and positive voltages were precisely adjusted to −2 kV and 22 kV, respectively, while maintaining a constant distance of 15 cm between the collector and the needle. The electrospinning time and sweeping distance for collection are 12 h and 20 cm, respectively. The electrospun membrane was subjected to a drying process in an oven at 60° C. for a duration of 12 hours, which had an approximate thickness of 80 μm. During the fabrication of CIC@HFP NFs, various concentrations of $Cs_2InCl_5(H_2O)$ (0 wt. %, 0.5 wt. %, 1 wt. %, 1.5 wt. %, 2 wt. %, and 3 wt. %) were adjusted and referred to as PVDF-HFP, 0.5CIC@HFP, 1CIC@HFP, 1.5CIC@HFP, 2CIC@HFP, and 3CIC@HFP, respectively.

Cytotoxicity Test of CIC@HFP NFs

Murine fibroblasts (NIH 3T3, ATCC) were used to detect the cytotoxicity of the CIC@HFP NFs. Firstly, NIH 3T3 was amplified in a-minimum basic medium (10% FBS, 1% Pen/Strep) and cultured at 37° C. The conditioned cell medium was obtained by soaking the CIC@HFP NFs in the cell medium. The CIC@HFP membrane was sterilized with ethanol (75%), ultraviolet light and PBS. Subsequently, the membrane was placed in cell culture medium. NIH 3T3 was inoculated into 96-well plates with about 2500 cells and 100 μL conditioned medium for different days. NIH 3T3 was inoculated with 1 ml conditioned medium into a fibronectin coated confocal culture dish of about 10,000 cells. At each time point, 10 μL CCK-8 solution was added for incubation to determine the optical density of formaldehyde solution at 450 nm wavelength, after that, CCK-8 cell viability was measured after incubation. Before imaging in a confocal dish, the cells were stained using the LIVE/DEAD Cell imaging Kit and incubated at 25° C. for 15 min. Lastly, the cells stained in the confocal dish were imaged with a Leica confocal microscope to qualitatively analyze the cytotoxicity and biocompatibility of CIC@HFP NFs.

Molecular Dynamics (MD) Simulation of the CIC@HFP NFs

To understand the $Cs_2InCl_5(H_2O)$ nanocrystals and PVDF-HFP polymer chains under the electrospinning process, the interfacial interaction of $Cs_2InCl_5(H_2O)$ nanocrystals and PVDF-HFP polymer chains was investigated under the electrical field. The model of PVDF-HFP and $Cs_2InCl_5(H_2O)$ was created to explore the bonding state between the two materials. The model's initial state is a 7*4*14 nm cube, ensuring the distance between them is 3 nm. The model's geometry was optimized to perform 100 ps NPT balance. In the electrospinning process, a voltage of 10 to 30 kV is usually applied to the syringe needle. The electric field strength around the tip should be in the range of about 0.07 V/Å to 10 V/Å. Finally, an electric field of 0.1 V/Å was applied along the model's Z-axis, simulating the strong electric field along the axis of the fiber chains from the tip to the receiving collector in the process of electrospinning and generating sufficient polarization of molecules, to calculate the field strength's influence on the binding force between them.

The calculation of interaction energy is related to the following equation:

$$E_{Int.} = E_{Total} - (E_{Layer1} + E_{Layer2})$$

Where the layer 1 and layer 2 correspond to the PVDF-HFP and $Cs_2InCl_5(H_2O)$ model, respectively.

Using the midpoint between the positive and negative charge centers as the reference point, the dipole moment can be determined from the following equation:

$$\mu = \sum_{a=1}^{N} Q_a\left[R_a - \left(\frac{q_{coc}^{+} + q_{coc}^{-}}{2}\right)\right]$$

Where $$q_{coc}^{+} \text{ and } q_{coc}^{-}$$

are the positive and negative charge centers, respectively, while $Q_a$ is the charge on atom a, and Ra is the position vector of atom a.

Characterization

Figure 7:
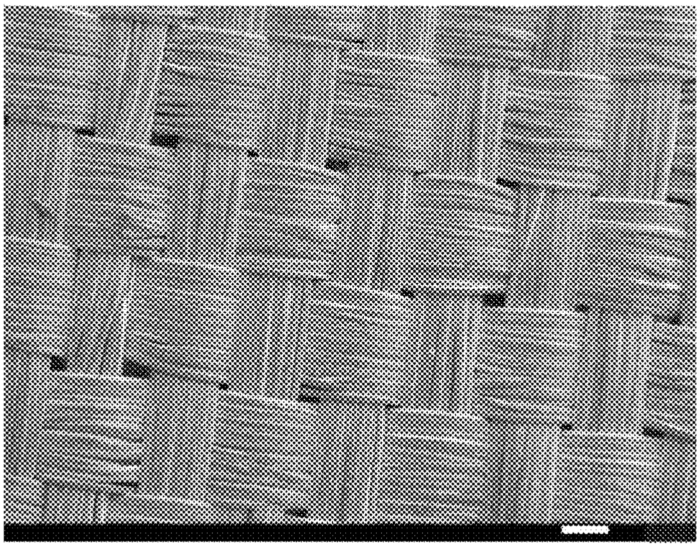
FIG. 7. The SEM image of the conductive fabric.
Figure 8:
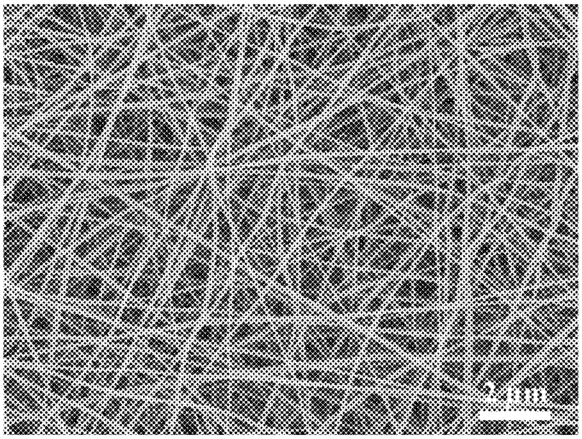
FIG. 8. The SEM image of the nylon 6,6 film.

PerkinElmer FTIR Spectrometer was utilized to analyze the chemical structure and groups. To obtain material phase information, Powder X-ray Diffraction (XRD) analysis was performed using a Bruker D2 Phaser XE-T X-ray diffractometer system. The scan rate was set at 5° $min^{-1}$, and the scan range of 2θ was maintained between 5° and 80°. The mechanic property of tensile-stress curves of CIC@HFP NFs was evaluated by Instron 5942 (load cell of 10 N, loading rate at 200 mm/min). X-ray photoelectron spectrum (XPS) was measured by the PHI Model 5802 spectrometer. The water vapor transfer rate (WVTR) of CIC@HFP NFs was measured by HD-E702-100-4 (Haida International Equipment). The morphology analysis was conducted by utilizing both scanning electron microscopy (SEM) with a JEOL 7001F instrument and transmission electron microscopy (TEM) with a Philips CM20 and Thermo Scientific FEI Talos F200X instruments. In the testing of selected electron diffraction (SAED), the electron beam with the beam diameter of 200 nm was used. The surface potential of samples was measured by Asylum MFP-3D Infinity in SKPM mode and performed in ambient condition. A conductive AFM probe with Pt/Ir coating was employed under a force constant of 2.8 N/m in the KPFM measurement, and the lift height was kept at 70-75 nm. The force parameters and output properties of TENG were performed by using a linear motor with the model of LinMot E1100, an electrometer with the model of Keithley 6514, and the digital oscilloscope Tektronix TBS1072C, respectively. The nanofibrous membranes of CIC@HFP and nylon 6,6 were cut into 3*3 $cm^2$ and pasted on the conductive fabric for the triboelectric performance test (FIGS. 7 and 8). The voltage and current over the external resistance range of 470 Ω~1 GΩ was measured under the applied pressure force of 80 N. In order to collect the biomechanical energy and physiological signal parameters of human movements, the friction positive and negative electrode materials were cut into an area size of 2*4 $cm^2$, and a double-sided elastomeric foam adhesive with a thickness of 0.1 mm was used as the spacer layer, and a conductive cloth (commercially available polyester fiber plain fabric with a nickel-copper plated surface, along with an adhesive backing on one side, with a thickness of about 0.1 mm and an impedance of 0.05 (2) was used as the conductive collecting electrode. And the fabric patch was fixed on human joints by medical tape for testing.

What is claimed is:

1. A core-shell nanofiber comprising: a core and a shell surrounding the core, wherein the core comprises $Cs_2InCl_5(H_2O)$ and the shell comprises an electroactive polymer comprising polyvinylidene fluoride-hexafluoropropylene (PVDF-HFP).

2. The core-shell nanofiber of claim 1, wherein $Cs_2InCl_5(H_2O)$ is present in the core-shell nanofiber at 0.1-5% wt/wt relative to the total weight of $Cs_2InCl_5(H_2O)$ and the electroactive polymer.

3. The core-shell nanofiber of claim 1, wherein the electroactive phase content of the PVDF-HFP is greater than 65.9%.

4. The core-shell nanofiber of claim 1, wherein the electroactive phase content of the PVDF-HFP is 70-81.25%.

5. The core-shell nanofiber of claim 1, wherein a plurality of the core-shell nanofibers has an average diameter of 450-600 nm.

6. The core-shell nanofiber of claim 1, wherein $Cs_2InCl_5(H_2O)$ is present in the core-shell nanofiber at 0.5-3% wt/wt relative to the total weight of $Cs_2InCl_5(H_2O)$ and PVDF-HFP; and the electroactive phase content of the PVDF-HFP is 70-81.25%.

7. The core-shell nanofiber of claim 1, wherein $Cs_2InCl_5(H_2O)$ is present in the core-shell nanofiber at 1-2% wt/wt relative to the total weight of $Cs_2InCl_5(H_2O)$ and PVDF-HFP; and the electroactive phase content of the PVDF-HFP is 75-81.25%.

8. The core-shell nanofiber of claim 1, wherein $Cs_2InCl_5(H_2O)$ is present in the core-shell nanofiber at about 1.5% wt/wt relative to the total weight of $Cs_2InCl_5(H_2O)$ and PVDF-HFP; and the electroactive phase content of the PVDF-HFP is about 81.25%.

9. A method for preparing the core-shell nanofiber of claim 1, the method comprising: providing an electrospinning solution comprising $Cs_2InCl_5(H_2O)$, the electroactive polymer, and a solvent; and electrospinning the electrospinning spinning solution thereby forming the core-shell nanofiber.

10. The method of claim 9, wherein the solvent comprises dimethyl formamide and acetone.

11. The method of claim 9, wherein the electrospinning solution has a solids concentration of 15-25% wt/wt.

12. The method of claim 9 further comprising drying the core-shell nanofiber.

13. The method of claim 9, wherein the electrospinning solution comprises $Cs_2InCl_5(H_2O)$ and PVDF-HFP in a weight ratio of about 1.5 to about 98.5, respectively.

14. A triboelectric nanogenerator comprising a triboelectric layer and at least one electrode, wherein the triboelectric layer comprises a plurality of the core-shell nanofibers of claim 1.

15. A triboelectric nanogenerator comprising a first electrode; a first triboelectric layer comprising a plurality of the core-shell nanofibers of claim 1 disposed on a surface of the first electrode; a second triboelectric layer disposed on a surface of the first triboelectric layer opposite of the first electrode, and a second electrode disposed on a surface of the second triboelectric layer opposite of the first triboelectric layer, wherein the first triboelectric layer has a triboelectric polarity different from that of the second triboelectric layer.

16. The triboelectric nanogenerator of claim 15, wherein the second triboelectric layer comprises silk, wool, rabbit fur, cotton, cellulose acetate, paper, polymethyl methacrylate, silica, nylon, polyurethane, or a combination thereof.

17. The triboelectric nanogenerator of claim 15 further comprising a spacer layer disposed between the first triboelectric layer and the second triboelectric layer.

18. The triboelectric nanogenerator of claim 17, wherein the spacer layer comprises one or more elastomeric materials selected from the group consisting of an elastic polymer, an elastic foam, a metal spring, a plastic spring, and combinations thereof.

19. The triboelectric nanogenerator of claim 15, wherein each of the first electrode and the second electrode independently comprise conductive cloth, copper, gold, silver, platinum, aluminum, nickel, an alloy thereof, or a combination thereof.

* * * * *